United States Patent
Ohnaka et al.

(10) Patent No.: US 12,181,577 B2
(45) Date of Patent: Dec. 31, 2024

(54) SENSOR DEVICE AND DETECTION METHOD

(71) Applicant: OMRON Corporation, Kyoto (JP)

(72) Inventors: Shoichi Ohnaka, Kameoka (JP); Kiyoshi Imai, Ayabe (JP); Yusuke Iida, Ayabe (JP); Ryosuke Tsuzuki, Ayabe (JP)

(73) Assignee: OMRON Corporation, Kyoto (JP)

( * ) Notice: Subject to any disclaimer, the term of this patent is extended or adjusted under 35 U.S.C. 154(b) by 937 days.

(21) Appl. No.: 17/279,078

(22) PCT Filed: Sep. 25, 2019

(86) PCT No.: PCT/JP2019/037443
§ 371 (c)(1),
(2) Date: Mar. 23, 2021

(87) PCT Pub. No.: WO2020/090291
PCT Pub. Date: May 7, 2020

(65) Prior Publication Data
US 2021/0389458 A1    Dec. 16, 2021

(30) Foreign Application Priority Data

Oct. 30, 2018 (JP) ................................. 2018-204154

(51) Int. Cl.
*G01S 17/10* (2020.01)
(52) U.S. Cl.
CPC .................................... *G01S 17/10* (2013.01)
(58) Field of Classification Search
CPC .................................................. G01S 7/4865
See application file for complete search history.

(56) References Cited

U.S. PATENT DOCUMENTS

| 2011/0098970 A1* | 4/2011 | Hug | G01F 23/292 |
| | | | 702/158 |
| 2015/0041625 A1* | 2/2015 | Dutton | G01T 1/2985 |
| | | | 341/166 |

(Continued)

FOREIGN PATENT DOCUMENTS

| CN | 104101880 | 10/2014 |
| CN | 104155640 | 11/2014 |

(Continued)

OTHER PUBLICATIONS

Machine translation of DE-10025968-A1 (Year: 2001).*
(Continued)

*Primary Examiner* — Yuqing Xiao
*Assistant Examiner* — Zhengqing Qi
(74) *Attorney, Agent, or Firm* — JCIPRNET

(57) ABSTRACT

Provided are a sensor device and a detection method. The sensor device includes: a light emitting unit transmitting a transmission signal toward a target; a light receiving unit receiving a reflected signal of the transmission signal and generating a binarized signal; a TDC delay line measurement unit and a waveform integration unit generating waveform data indicating temporal changes in the binarized signal and integrating the waveform data to generate integrated waveform data; a stage number calculation unit and a distance conversion unit calculating a near-side distance value and a far-side distance value from intersections of the integrated waveform data and a high threshold value and a low threshold value, respectively; and a determination unit determining whether the target is present on the basis of a distance value calculated from the near-side distance value and the far-side distance value and on the basis of a predetermined distance threshold value.

12 Claims, 13 Drawing Sheets

(56) References Cited

U.S. PATENT DOCUMENTS

| | | | | |
|---|---|---|---|---|
| 2015/0102205 A1* | 4/2015 | Baba | ............ | G01V 8/12 |
| | | | | 250/206 |
| 2016/0255696 A1* | 9/2016 | Pawlak | ............ | G01V 8/12 |
| | | | | 315/151 |
| 2016/0299219 A1 | 10/2016 | Suzuki et al. | | |
| 2016/0368754 A1* | 12/2016 | Rosenlund | ............ | B67D 1/0882 |

FOREIGN PATENT DOCUMENTS

| | | | | |
|---|---|---|---|---|
| CN | 107533136 | | 1/2018 | |
| CN | 107783099 | | 3/2018 | |
| DE | 10025968 | | 7/2001 | |
| DE | 10025968 A1 * | 7/2001 | ............ | G01S 17/10 |
| EP | 3477340 | | 5/2019 | |
| JP | H05223928 | | 9/1993 | |
| JP | H05223928 A * | 9/1993 | | |
| JP | 2000121726 | | 4/2000 | |
| JP | 2003084074 | | 3/2003 | |
| JP | 2004125559 | | 4/2004 | |
| JP | 2006078371 | | 3/2006 | |
| JP | 2008107284 | | 5/2008 | |
| JP | 2011215005 | | 10/2011 | |
| JP | 2015075453 | | 4/2015 | |
| JP | 2015215345 | | 12/2015 | |
| JP | 2017166998 | | 9/2017 | |
| JP | 2018017534 | | 2/2018 | |
| JP | 2018152823 | | 9/2018 | |
| JP | 2019082331 | | 5/2019 | |
| WO | 2016204924 | | 12/2016 | |
| WO | 2018086943 | | 5/2018 | |
| WO | 2019049480 | | 3/2019 | |

OTHER PUBLICATIONS

Machine translation of JPH05223928A (Year: 1993).*
"International Search Report (Form PCT/ISA/210) of PCT/JP2019/037443", mailed on Dec. 10, 2019, with English translation thereof, pp. 1-4.
"Written Opinion of the International Searching Authority (Form PCT/ISA/237) of PCT/JP2019/037443", mailed on Dec. 10, 2019, with English translation thereof, pp. 1-10.
"Office Action of China Counterpart Application", issued on Dec. 6, 2023, with English translation thereof, pp. 1-17.
"Search Report of Europe Counterpart Application", issued on Jun. 9, 2022, p. 1-p. 12.

* cited by examiner

SENSOR DEVICE AND DETECTION METHOD

CROSS-REFERENCE TO RELATED APPLICATION

This application is a 371 application of the International PCT application serial no. PCT/JP2019/037443, filed on Sep. 25, 2019, which claims the priority benefit of Japan Patent Application No. 2018-204154, filed on Oct. 30, 2018. The entirety of each of the above-mentioned patent applications is hereby incorporated by reference herein and made a part of this specification.

BACKGROUND

Technical Field

The present invention relates to a sensor device and a detection method.

Related Art

Conventionally, as a photoelectric sensor, there is known a sensor including a light emitting element that iteratively generates detection light, a light receiving element that receives reflected light of the detection light, a binarization processing unit that binarizes a light reception signal, a waveform detecting unit that detects waveform data indicating a change in a binarized light reception signal over time, a waveform integration unit that integrates two or more pieces of waveform data by matching light emitting timings of the light emitting element and generates integrated waveform data, and a workpiece discriminating unit that discriminates presence or absence of a workpiece on the basis of the integrated waveform data (see Patent Literature 1). The photoelectric sensor is capable of sampling reflected light at a high speed and detecting a workpiece, while a circuit size is reduced.

LITERATURE OF RELATED ART

Patent Literature

Patent Literature 1: Japanese Patent Laid-open No. 2015-75453

SUMMARY

Problems to be Solved

The photoelectric sensor in Patent Literature 1 measures a time from a transmission timing of a transmission signal to a timing when a reflected signal is received, thereby computing a distance to a target object and determining whether or not the target object is located at a desired set distance.

Regarding a set distance, a hysteresis width indicating a difference between an on-point threshold value at which presence of a target object is determined from a state where no target object is detected and an off-point threshold value at which no detection of a target object is determined from a state where a target object is detected, in some cases. For example, with respect to a set distance of 1,000 mm, the on-point threshold value is set to 1,000 mm, the off-point threshold value is set to 990 mm, and the hysteresis width is set to 10 mm.

When a reception signal is binarized and a distance to a target object is computed on the basis of an integration signal obtained by integrating a binarized signal a plurality of times, an integration threshold value is set with respect to the integration signal, and the distance is measured from a time when the integration signal exceeds the integration threshold value.

However, when a target object has a low reflectance, a variation in measured distance is large, and thus a wide hysteresis width needs to be set. On the other hand, when a target object has a high reflectance, a variation in measured distance is small. Hence, when the hysteresis width for the target object having the low reflectance is used, the wide hysteresis width is set, and thus a measured distance is unlikely to exceed the on-point threshold value or the off-point threshold value. Therefore, detection precision of a target object depends on the reflectance of the target object.

In this respect, an object of the present invention is to provide a sensor device and a detection method that enable highly precise detection of a target object irrespective of reflectance of the target object.

Means to Solve Problems

The sensor device according to an aspect of the present invention includes: a light emitting unit that transmits a transmission signal toward a target object; a light receiving unit that receives a reflected signal of the transmission signal and generates a binarized signal; an integration unit that generates waveform data indicating a change in the binarized signal over time and integrates a plurality of pieces of the waveform data to generate integrated waveform data; a distance calculation unit that calculates a first distance value and a second distance value from respective intersections of a first integration threshold value and a second integration threshold value with the integrated waveform data; and a determination unit that determines presence or absence of the target object on a basis of a predetermined distance threshold value and a distance value calculated from the first distance value and the second distance value.

According to the aspect, the first distance value and the second distance value from the respective intersections of the first integration threshold value and the second integration threshold value with the integrated waveform data are calculated, and presence or absence of the target object is determined on the basis of the predetermined distance threshold value and the distance value calculated from the first distance value and the second distance value. Here, when the target object has a high reflectance, the integrated waveform data has a steep inclination, and thus a width between the first distance value and the second distance value is relatively narrow, even when a difference between the first integration threshold value and the second integration threshold value is constant. On the other hand, when the target object has a low reflectance, the integrated waveform data has a gentle inclination, and thus the width between the first distance value and the second distance value is relatively wide, even when the difference between the first integration threshold value and the second integration threshold value is constant. Hence, the first distance value and the second distance value from the respective intersections of the first integration threshold value and the second integration threshold value with the integrated waveform data are calculated, and thereby the width between the first distance value and the second distance value can be changed depending on the reflectance. Consequently, presence or absence of the target object is determined on the basis of the predetermined distance threshold value and the distance value calculated from the first distance value and the second distance value, and thereby detection of the target object can be performed with high precision irrespective of the reflectance of the target object.

In the above-described aspect, the determination unit may determine presence or absence of the target object on a basis of the distance value, the predetermined distance threshold value and a hysteresis value based on an absolute value of a difference between the first distance value and the second distance value, when a previous determination result indicates presence of the target object.

According to the aspect, when the previous determination result indicates the presence of the target object, presence or absence of the target object is determined on the basis of the distance value, the predetermined distance threshold value and the hysteresis value based on the absolute value of the difference between the first distance value and the second distance value. For example, the distance value calculated from the first distance value and the second distance value is compared to a sum of the predetermined distance threshold value and the hysteresis value, and thereby it is possible to have a width (margin) in determination by the hysteresis value, and it is possible to inhibit too sensitive reaction to a change in distance value calculated from the first distance value and the second distance value in determination performed after the determination of the presence of the target object.

In the above-described aspect, the distance calculation unit may calculate the first distance value and the second distance value by performing sub-pixel processing using data obtained immediately in front of and immediately behind the respective intersections of the first integration threshold value and the second integration threshold value with the integrated waveform data.

According to the aspect, the first distance value and the second distance value are calculated by performing the sub-pixel processing using the data obtained immediately in front of and immediately behind the respective intersections of the first integration threshold value and the second integration threshold value with the integrated waveform data. For example, it is possible to calculate a distance with resolution of one or more stages of delay elements. Consequently, measurement precision of a distance to a periphery of the target object can be improved.

In the above-described aspect, the integration unit may include a first integration unit that performs sampling of the binarized signal at a predetermined cycle to generate first waveform data and integrates the first waveform data for a plurality of times of transmission of the transmission signal to generate first integrated waveform data, a timing determination unit that determines a reference timing based on a position of a characteristic point appearing on the first integrated waveform data due to the presence of the target object and generates a stop signal on a basis of the reference timing, and a second integration unit that includes a delay circuit unit, the delay circuit unit including a plurality of delay elements connected to each other in series, in which second waveform data is generated by causing each of the delay elements to incorporate the binarized signal in response to the stop signal, and second integrated waveform data is generated by integrating the second waveform data a plurality of times at a predetermined cycle. The distance calculation unit may calculate the first distance value and the second distance value from the respective intersections of the first integration threshold value and the second integration threshold value with the second integrated waveform data.

According to the aspect, the reference timing is determined based on the position of the characteristic point appearing on the first integrated waveform data due to the presence of the target object, and the stop signal is generated on a basis of the reference timing. In addition, the second waveform data is generated by causing each of the delay elements to incorporate the binarized signal in response to the stop signal, and the second integrated waveform data is generated by integrating the second waveform data a plurality of times at the predetermined cycle. In this manner, a signal is generated from a periphery of a measurement point, based on the characteristic point appearing due to the presence of the target object, and thereby a time taken to the periphery of the target object can be measured with high precision. Hence, the measurement precision of the distance to the periphery of the target object can be improved without increasing a circuit size, and a range of a detectable distance can be widened.

In the above-described aspect, the second integration unit may include a plurality of the delay circuit units connected to each other in parallel and may integrate the second integrated waveform data generated by each of the delay circuit units.

According to the aspect, the second integrated waveform data generated by each of the delay circuit units integrate is integrated. Hence, compared to a case where the delay circuit units are provided in a single line, the number of times of sampling performed in the same time can be more increased. Consequently, the sensor device can be suitable for a high-speed output.

In the above-described aspect, the first integration unit may have a nanosecond-order resolution, and the delay circuit unit may have a picosecond-order resolution.

According to the aspect, the first integration unit has the nanosecond-order resolution, and the delay circuit unit has the picosecond-order resolution. Hence, the measurement precision of the distance to a periphery of the target object can be improved.

The detection method according to another aspect of the present invention is a method for detecting a target object and includes: a signal transmission step of transmitting a transmission signal toward the target object; a signal reception step of receiving a reflected signal of the transmission signal and generating a binarized signal; an integration step of generating waveform data indicating a change in the binarized signal over time and integrating a plurality of pieces of the waveform data to generate integrated waveform data; a distance calculation step of calculating a first distance value and a second distance value from respective intersections of a first integration threshold value and a second integration threshold value with the integrated waveform data; and a determination step of determining presence or absence of the target object on a basis of a predetermined distance threshold value and a distance value calculated from the first distance value and the second distance value.

According to the aspect, the first distance value and the second distance value are calculated from the respective intersections of the first integration threshold value and the second integration threshold value with the integrated waveform data are calculated, and presence or absence of the target object is determined on the basis of the predetermined distance threshold value and the distance value calculated from the first distance value and the second distance value. Here, when the target object has the high reflectance, the integrated waveform data has a steep inclination, and thus a width between the first distance value and the second distance value is relatively narrow, even when a difference between the first integration threshold value and the second integration threshold value is constant. On the other hand, when the target object has the low reflectance, the integrated waveform data has a gentle inclination, and thus the width between the first distance value and the second distance value is relatively wide, even when the difference between the first integration threshold value and the second integration threshold value is constant. Hence, the first distance value and the second distance value from the respective intersections of the first integration threshold value and the second integration threshold value with the integrated waveform data are calculated, and thereby the width between the first distance value and the second distance value can be changed depending on the reflectance. Consequently, presence or absence of the target object is determined on the basis of the predetermined distance threshold value and the distance value calculated from the first distance value and the second distance value, and thereby detection of the target object can be performed with high precision irrespective of the reflectance of the target object.

In the above-described aspect, the determination step may include determining presence or absence of the target object, on a basis of the distance value, the predetermined distance threshold value and a hysteresis value based on an absolute value of a difference between the first distance value and the second distance value, when a previous determination result indicates presence of the target object.

According to the aspect, when the previous determination result indicates the presence of the target object, presence or absence of the target object is determined on the basis of the distance value, the predetermined distance threshold value and the hysteresis value based on the absolute value of the difference between the first distance value and the second distance value. For example, the distance value calculated from the first distance value and the second distance value is compared to a sum of the predetermined distance threshold value and the hysteresis value, and thereby it is possible to have a width (margin) in determination by the hysteresis value, and it is possible to inhibit too sensitive reaction to a change in distance value calculated from the first distance value and the second distance value in determination performed after the determination of the presence of the target object.

In the above-described aspect, the distance calculation step may include calculating the first distance value and the second distance value by performing sub-pixel processing using data obtained immediately in front of and immediately behind the respective intersections of the first integration threshold value and the second integration threshold value with the integrated waveform data.

According to the aspect, the first distance value and the second distance value are calculated by performing the sub-pixel processing using the data obtained immediately in front of and immediately behind the respective intersections of the first integration threshold value and the second integration threshold value with the integrated waveform data. For example, it is possible to calculate a distance with resolution of one or more stages of delay elements. Consequently, measurement precision of a distance to a periphery of the target object can be improved.

In the above-described aspect, the integration step may include a first integration step of sampling the binarized signal at a predetermined cycle to generate first waveform data and integrating the first waveform data for a plurality of times of transmission of the transmission signal to generate first integrated waveform data, a timing determination step of determining a reference timing based on a position of a characteristic point appearing on the first integrated waveform data due to the presence of the target object and generating a stop signal on a basis of the reference timing, and a second integration step of generating, in a delay circuit unit including a plurality of delay elements connected to each other in series, second waveform data by causing each of the delay elements to incorporate the binarized signal in response to the stop signal and generating second integrated waveform data by integrating the second waveform data a plurality of times at a predetermined cycle. The distance calculation step may include calculating the first distance value and the second distance value from the respective intersections of the first integration threshold value and the second integration threshold value with the second integrated waveform data.

According to the aspect, the reference timing is determined based on the position of the characteristic point appearing on the first integrated waveform data due to the presence of the target object, and the stop signal is generated on a basis of the reference timing. In addition, the second waveform data is generated by causing each of the delay elements to incorporate the binarized signal in response to the stop signal, and the second integrated waveform data is generated by integrating the second waveform data a plurality of times at the predetermined cycle. In this manner, a signal is generated from a periphery of a measurement point, based on the characteristic point appearing due to the presence of the target object, and thereby a time taken to the periphery of the target object can be measured with high precision. Hence, the measurement precision of the distance to the periphery of the target object can be improved without increasing a circuit size, and a range of a detectable distance can be widened.

In the above-described aspect, the second integration step may include integrating, in a plurality of the delay circuit units connected to each other in parallel, the second integrated waveform data generated by each of the delay circuit units.

According to the aspect, the second integrated waveform data generated by each of the delay circuit units integrate is integrated. Hence, compared to a case where the delay circuit units are provided in a single line, the number of times of sampling performed in the same time can be more increased. Consequently, the sensor device can be suitable for a high-speed output.

In the above-described aspect, the first integration step may be executed with a nanosecond-order resolution, and the delay circuit unit may have a picosecond-order resolution.

According to the aspect, the first integration unit has the nanosecond-order resolution, and the delay circuit unit has the picosecond-order resolution. Hence, the measurement precision of the distance to a periphery of the target object can be improved.

Effect

According to the present invention, it is possible to provide a sensor device and a detection method that enable highly precise detection of a target object irrespective of reflectance of the target object.

DESCRIPTION OF THE EMBODIMENTS

Figure 1:
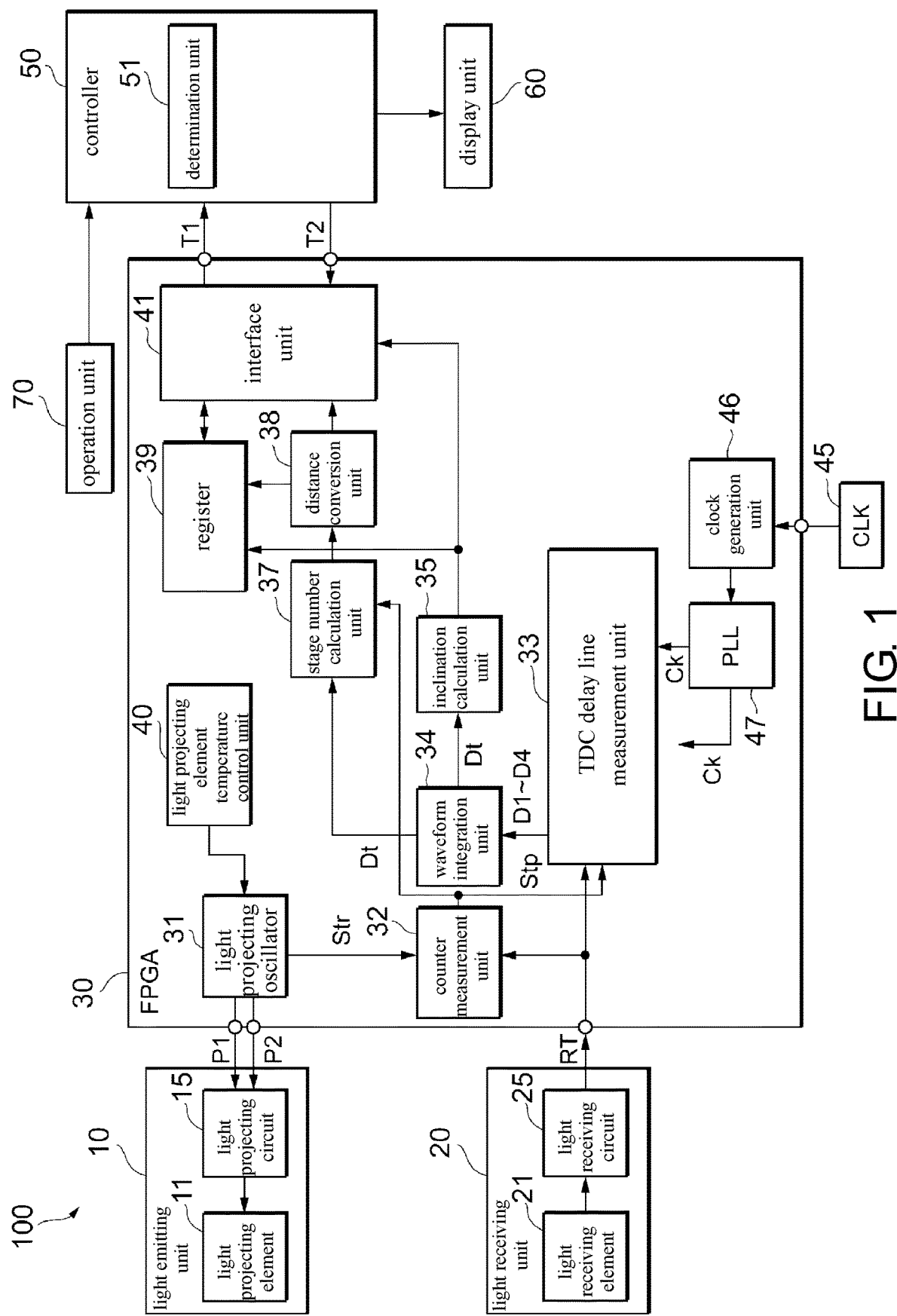
FIG. 1 is a block diagram illustrating a configuration of a sensor device according to an embodiment.

Preferred embodiments of the present invention are described with reference to the accompanying drawings. Moreover, in the drawings, components assigned with the same reference sign have the same or similar configuration.

Figure 2:
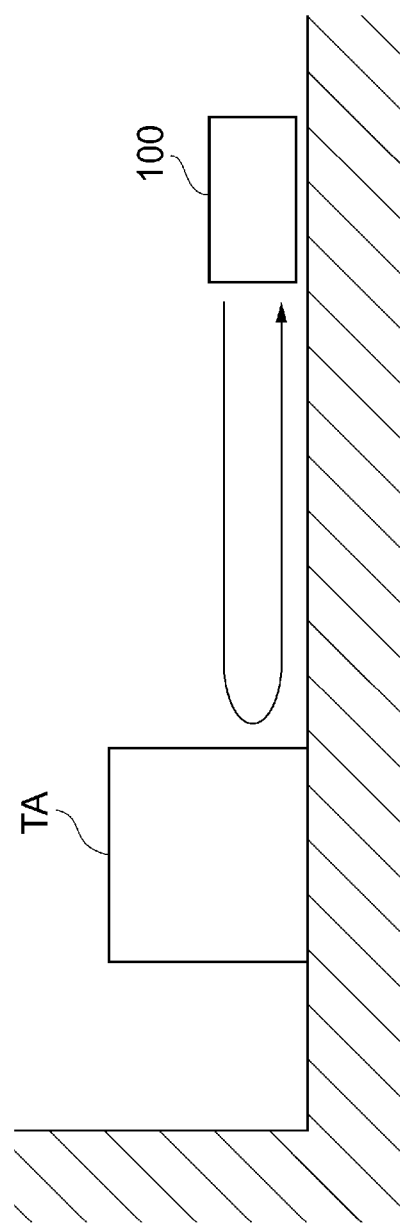
FIG. 2 is a schematic diagram illustrating a detection principle of the sensor device illustrated in FIG. 1.
Figure 3:
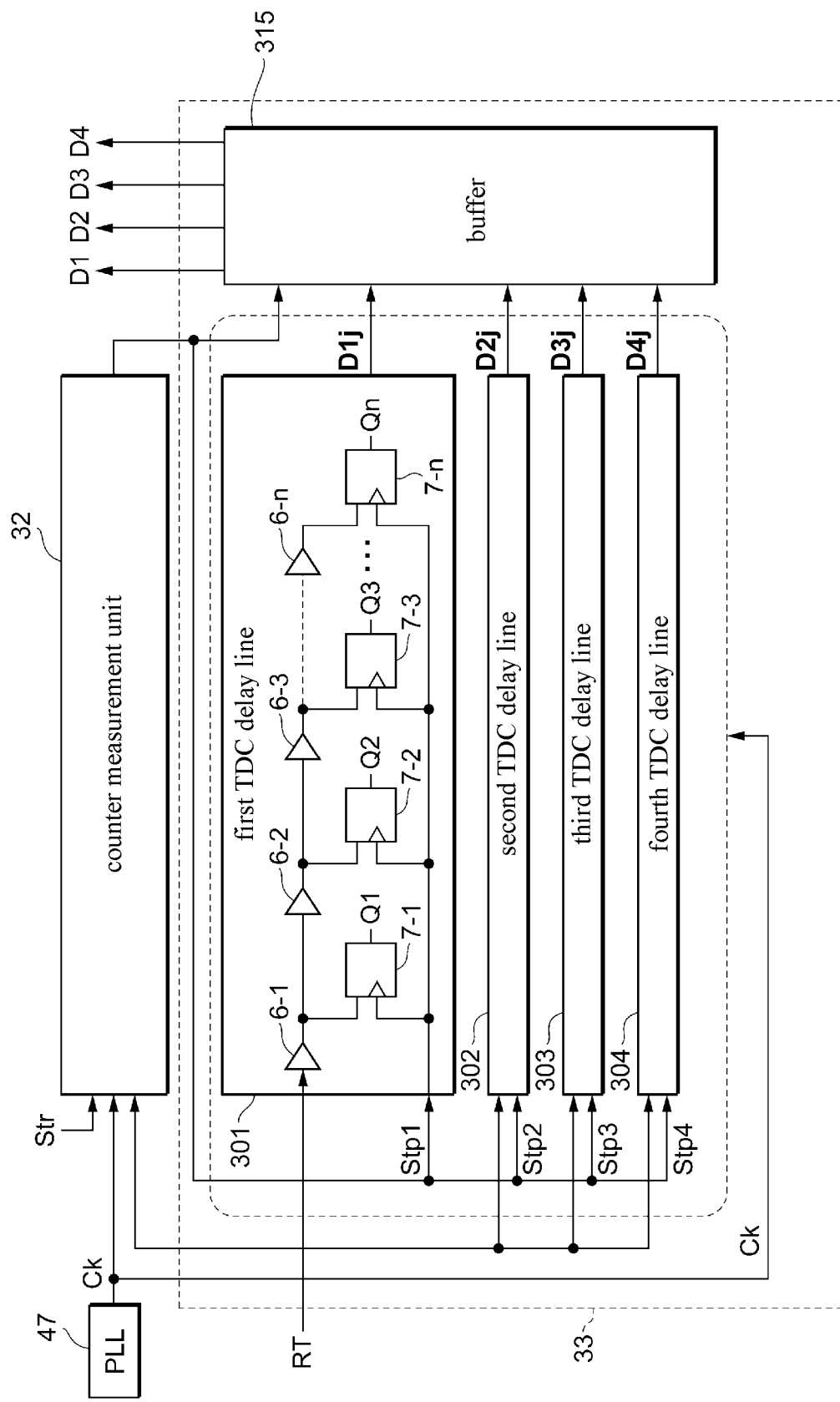
FIG. 3 is a block diagram illustrating a configuration of a TDC delay line measurement unit and a periphery thereof illustrated in FIG. 1.
Figure 4:
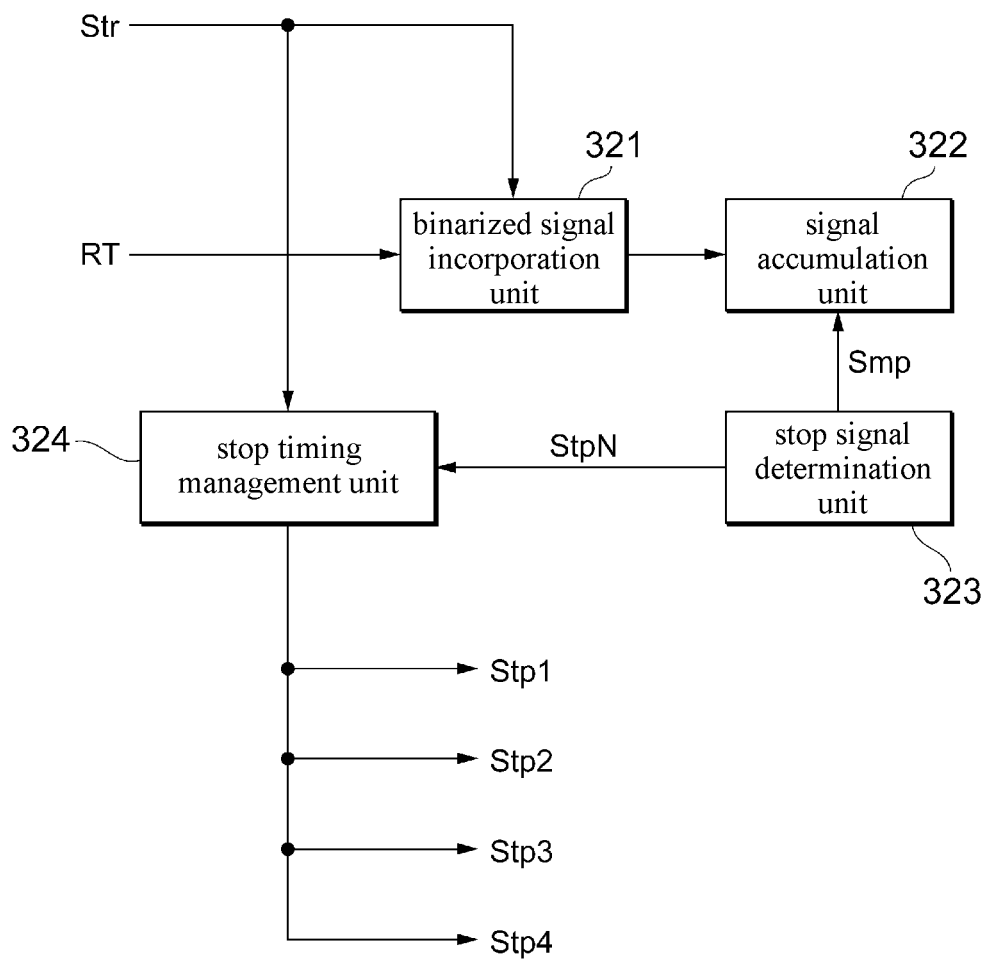
FIG. 4 is a block diagram illustrating a configuration of a counter measurement unit illustrated in FIG. 1.

First, with reference to FIGS. 1 to 4, an example of a configuration of a sensor device according to this embodiment is described. FIG. 1 is a block diagram illustrating a configuration of a sensor device 100 according to an embodiment. FIG. 2 is a schematic diagram illustrating a detection principle of the sensor device 100 illustrated in FIG. 1. FIG. 3 is a block diagram illustrating a configuration of a TDC delay line measurement unit 33 and a periphery thereof illustrated in FIG. 1. FIG. 4 is a block diagram illustrating a configuration of a counter measurement unit 32 illustrated in FIG. 1.

As illustrated in FIG. 1, the sensor device 100 includes a light emitting unit 10, a light receiving unit 20, a field-programmable gate array (FPGA) 30, a CLK 45, a controller 50, a display unit 60, and an operation unit 70. For example, the sensor device 100 is a photoelectric sensor and is used for detecting a target object.

As illustrated in FIG. 2, the sensor device 100 emits detection light toward a target object TA. The detection light reflected from the target object TA returns to the sensor device 100 to be received. The received detection light is subjected to signal processing in the sensor device 100, and thereby the sensor device 100 can precisely measure a distance to the target object TA on the basis of a time taken from light projection to light reception. As a result, the target object TA located at a predetermined distance (position) from the sensor device 100 can be detected. Moreover, in addition to the example illustrated in FIG. 2, a case where the target object TA flowing on a line in a factory is detected from above is also conceivable. Besides, in addition to the light, an electromagnetic wave, a sound wave, or the like is also conceivable to be output toward the target object TA from the sensor device 100.

Returning to the description of FIG. 1, the light emitting unit 10 is configured to emit the detection light toward the target object TA. The light emitting unit 10 has a light projecting element 11 and a light projecting circuit 15. The light projecting element 11 iteratively emits detection light toward the target object TA illustrated in FIG. 2. Hereinafter, an example in which the detection light is emitted cyclically is described; however, the detection light may be randomly emitted. For example, the light projecting element 11 is configured to have a laser diode (LD), and the detection light is pulsed light. A pulse control signal P1 and a power control signal P2 of the light projecting element 11 are input to the light projecting circuit 15 from the FPGA 30, and the light projecting circuit 15 controls detection light emitted from the light projecting element 11 on the basis of the pulse control signal P1 and the power control signal P2.

The light receiving unit 20 is configured to receive reflected light of the detection light and generate a binarized signal RT. The light receiving unit 20 has a light receiving element 21 and a light receiving circuit 25. The light receiving element 21 receives the detection light reflected from the target object TA illustrated in FIG. 2 and outputs a light reception signal. For example, the light receiving element 21 is configured to have an avalanche photo diode (APD). The light receiving circuit 25 compares a light reception amount of the light reception signal input from the light receiving element 21 to a predetermined threshold value to perform binarization and generates the binarized signal RT. The light receiving circuit 25 outputs the generated binarized signal RT.

The FPGA 30 includes a light projecting oscillator 31, a counter measurement unit 32, a time-to-digital converter (TDC) delay line measurement unit 33, a waveform integration unit 34, an inclination integration unit 35, a stage number calculation unit 37, a distance conversion unit 38, a register 39, a light projecting element temperature control unit 40, an interface unit 41, a clock generation unit 46, and a phase locked loop (PLL) 47. The FPGA 30 can also be replaced with an integrated circuit such as an application specific integrated circuit (ASIC).

For example, the CLK 45 outputs an oscillation signal of 20 MHz to the clock generation unit 46. The oscillation signal is input to the clock generation unit 46, and the clock generation unit 46 generates and outputs a reference clock on the basis of the oscillation signal. The reference clock is input to the PLL 47, and the PLL 47 generates and outputs a clock signal Ck phase-synchronized with a desired frequency on the basis of the reference clock. The clock signal Ck is supplied to components of the FPGA 30.

An output signal is input to the light projecting oscillator 31 from the light projecting element temperature control unit 40. The light projecting oscillator 31 generates and outputs the pulse control signal P1 and the power control signal P2 and to the light projecting circuit 15 described above, on the basis of the output signal. The light projecting element temperature control unit 40 is to control light projecting power of the detection light emitted from the light emitting unit 10, based on temperature information of the light projecting element 11. In addition, the light projecting oscillator 31 synchronizes a start signal Str for starting counting in the counter measurement unit 32 with the pulse control signal P1 to output the synchronized pulse control signal to the counter measurement unit 32.

The binarized signal RT and a start signal St are input to the counter measurement unit 32. The counter measurement unit 32 generates a stop signal Stp corresponding to a characteristic point of the binarized signal RT and outputs the generated stop signal Stp. The counter measurement unit 32 will be described below in detail.

The binarized signal RT and the stop signal Stp are input to the TDC delay line measurement unit 33. The TDC delay line measurement unit 33 generates delay line output signals D1 to D4 and outputs the generated delay line output signals D1 to D4 to the waveform integration unit 34. In the TDC delay line measurement unit 33 differs from a TDC that measures a time point of a stop pulse which is delayed from a start pulse to arrive, that is, a single hit TDC using a delay line.

The waveform integration unit 34 integrates the delay line output signals D1 to D4 input from the TDC delay line measurement unit 33 a plurality of times and generates an integration signal Dt. The waveform integration unit 34 outputs the generated integration signal Dt to the inclination calculation unit 35 and the stage number calculation unit 37.

The inclination calculation unit 35 calculates an inclination of the integration signal Dt input from the waveform integration unit 34. For example, the inclination calculation unit 35 calculates an amplitude of the integration signal Dt, that is, a high value from an intersection of the integration signal Dt with a predetermined high threshold value for inclination with respect to times of integration. Similarly, the inclination calculation unit 35 calculates a low value from an intersection of the integration signal Dt with a predetermined low threshold value for inclination with respect to times of integration of the integration signal Dt. Besides, an inclination α calculated by the inclination calculation unit 35 is expressed as in Expression (1) below using the above values.

Inclination α=(High Threshold Value for Inclination−Low Threshold Value for Inclination)/(High Value−Low Value)   Expression (1)

The inclination calculation unit 35 outputs the calculated inclination to the register 39 via the interface unit 41.

The stage number calculation unit 37 calculates the number of stages of delay circuits included in the TDC delay line measurement unit 33 on the basis of the integration signal Dt input from the waveform integration unit 34. The delay circuits of the TDC delay line measurement unit 33 will be described below. The stage number calculation unit 37 outputs the calculated number of stages of the delay circuits to the distance conversion unit 38.

The distance conversion unit 38 converts the number of stages of the delay circuits which is input from the stage number calculation unit 37 into a distance from the sensor device 100 and outputs the converted distance.

The inclination calculated by the inclination calculation unit 35 and the distance converted by the distance conversion unit 38 are input to the register 39, and the register 39 stores the inclination and the distance.

The interface unit 41 outputs, to the controller 50, the inclination calculated by the inclination calculation unit 35 and an output result of the distance conversion unit 38 which are stored in the register 39, as a measured signal T1.

The controller 50 is configured to control the display unit 60 and the operation unit 70. For example, the controller 50 obtains a light reception amount from the inclination of the integration signal Dt on the basis of the measured signal T1 input from the interface unit 41, and outputs the obtained light reception amount to the display unit 60. In addition, the controller 50 generates setting data T2 corresponding to information input by a user operation of the operation unit 70 and outputs the generated setting data T2 to the interface unit 41. For example, the controller 50 is configured to have a microprocessor such as a central processing unit (CPU), memories such as a read only memory (ROM) and a random access memory (RAM), and a buffering storage device such as a buffer.

In addition, the controller 50 includes a determination unit 51 as a functional configuration of the controller. The determination unit 51 determines presence or absence of the target object TA at a predetermined distance as illustrated in FIG. 2, that is, presence or absence of the target object TA, on the basis of the output result of the distance conversion unit 38 which is included in the measured signal T1 input from the interface unit 41. The controller 50 outputs a determination result to the display unit 60.

The display unit 60 is to output information. The display unit 60 displays the light reception amount input from the controller 50. In addition, the display unit 60 displays the presence or absence of the target object TA on the basis of the detection result input from the controller 50. For example, the display unit 60 is configured to have an indicating lamp such as a lamp or a light emitting diode (LED) and a display such as an organic electro-luminescence display (OLED).

The operation unit 70 is to input information. The operation unit 70 outputs a signal corresponding to a user operation to the controller 50. For example, the operation unit 70 is configured to have a plurality of buttons.

As illustrated in FIG. 3, the counter measurement unit 32 starts counting of the binarized signals RT in response to the start signal St. The counting of the binarized signals RT is performed based on the clock signal Ck input from the PLL 47. In addition, the counter measurement unit 32 generates stop signals Stp1, Stp2, Stp3, and Stp4 (hereinafter, collectively referred to as the "stop signals Stp") corresponding to a characteristic point of the binarized signal RT and outputs the stop signals to the TDC delay line measurement unit 33.

The TDC delay line measurement unit 33 has a first TDC delay line 301, a second TDC delay line 302, a third TDC delay line 303, a fourth TDC delay line 304, and a buffer 315. Moreover, FIG. 3 illustrates an example in which the TDC delay line measurement unit 33 is configured of four TDC delay lines; however, the configuration of the TDC delay line measurement unit is not limited thereto. The TDC delay line measurement unit 33 may have an increase or a decrease in TDC delay lines, depending on a size of logic capacity.

The first TDC delay line 301 has delay elements 6-1, 6-2, 6-3, . . . , and 6-n (n is a positive integer) (hereinafter, collectively referred to as the "delay element 6") and flip-flop circuits 7-1, 7-2, 7-3, . . . , and 7-n (hereinafter, collectively referred to as the "flip-flop circuit 7"). The delay element 6 is configured to have, for example, an inverter, that is a NOT gate. The flip-flop circuit 7 is configured to have, for example, D flip-flop, and the D flip-flop can also be replaced with a latch circuit or the like. The delay element 6 causes delay to occur by using a rise due to high-speed computing carry of a logic element (LE). Hence, in the FPGA 30, the delay element 6 having the picosecond-order resolution is realized. In addition, the delay element 6 in the FPGA 30 can also be realized by using a delay between a clock input and a Q input of the D flip-flop. In this case, a stable delay time of nanosecond order can be obtained.

The delay element 6-1 delays the input binarized signal RT for a constant time and then outputs the delayed signal to the delay element 6-2 and the flip-flop circuit 7-1. The flip-flop circuit 7-1 outputs an input from the delay element 6-1, at a timing when the stop signal Stp1 is input. The delay element 6-2 delays the input from the delay element 6-1 for a constant time and then inputs an obtained signal to the delay element 6-3 and the flip-flop circuit 7-2. The flip-flop circuit 7-2 outputs an input from the delay element 6-2, at a timing when the stop signal Stp1 is input. Hereinafter, this is true of the rest delay elements from the delay element 6-3 and the rest flip-flop circuits from the flip-flop circuit 7-3, and thus the description thereof is omitted.

The first TDC delay line 301 combines delay signals Q1, Q2, Q3, . . . , and Qn (hereinafter, collectively referred to as the "delay signal Q") which are subjected to synchronization to be output from the flip-flop circuits 7-1, 7-2, 7-3, . . . , and 7-n and outputs a delay line output signal D1j (j is an integer from 1 to m, and m is a positive integer). The delay line output signal D1j is waveform data of the binarized signal RT having a time length equivalent to a total delay time of the delay elements 6-1, 6-2, 6-3, . . . , and 6-n.

The delay line output signal D1j is output to the buffer 315, and then the first TDC delay line 301 is reset primarily. Then, the delay line output signal D1j is re-generated from the next binarized signal RT. The delay line output signals D1j are generated until integration thereof is performed predetermined times such as m times (j=m), and the delay line output signals are accumulated in the buffer 315. The buffer 315 outputs the delay line output signal D1 obtained by integrating the delay line output signal D1j m times. This is true of the delay line output signals D2 to D4 of the TDC delay lines 302 to 304, and thus the description thereof is omitted. In addition, the TDC delay lines 302 to 304 have the same circuit configuration as the TDC delay line 301 has, and thus the illustration and the description thereof are omitted. The TDC delay lines 301 to 304 are each driven by the clock signal Ck input from the PLL 47.

A delay width of the delay elements 6 included in the TDC delay lines 301 to 304 changes depending on an ambient temperature. Therefore, when a distance from the sensor device 100 to the target object TA is calculated on the basis of the delay width, the calculated distance fluctuates in association with the temperature. In order to compensate for fluctuations of the number of delay stages due to the temperature, the TDC delay line measurement unit 33 may further have a temperature compensating TDC delay line. In this case, the temperature compensating TDC delay line outputs a signal indicating the number of delay stages in association with the temperature to the distance conversion unit 38 described above, for example, and the distance conversion unit 38 performs temperature-compensating for the number of stages of the delay circuits which is input from the stage number calculation unit 37 by using the corresponding signal. Besides, the distance conversion unit 38 converts the temperature-compensated number of stages of delay elements to a distance. Hence, it is possible to compensate for the fluctuation (variation) in the measurement result due to the ambient temperature.

As illustrated in FIG. 4, the counter measurement unit 32 includes a binarized signal incorporation unit 321, a signal accumulation unit 322, a stop signal determination unit 323, and a stop timing management unit 324. The binarized signal incorporation unit 321 incorporates the binarized signal RT on the basis of a timing of the start signal Str. The signal accumulation unit 322 accumulates the incorporated binarized signals RT. In the signal accumulation unit 322, measuring results obtained by n measurement cycles are integrated in rough measurement by a clock base to be described below. The stop signal determination unit 323 outputs a sampling signal Smp based on the clock signal to the signal accumulation unit 322 that accumulates the binarized signals RT.

The stop signal determination unit 323 confirms a rising point in integrated value of the binarized signals RT which first intersects with a determination threshold value, as a measurement point, and the stop signal determination unit outputs a stop signal StpN at the rising point. Moreover, the measurement point is not limited to the rising time point and may be a falling start point or another characteristic point. The stop timing management unit 324 receives the stop signal StpN to simultaneously output the stop signals Stp1, Stp2, Stp3, and Stp4 to the TDC delay lines 301 to 304, respectively, every predetermined times, for example, every 128 times of the clock cycle on the basis of a timing of the start signal Str. The stop timing management unit 324 is configured to have a register for compensating for a time difference due to a difference in length of wiring through which the stop signals Stp1, Stp2, Stp3, and Stp4 are output. A use of the register can inhibit fluctuation (variation) of time measurement value due to the wiring length.

Figure 5:
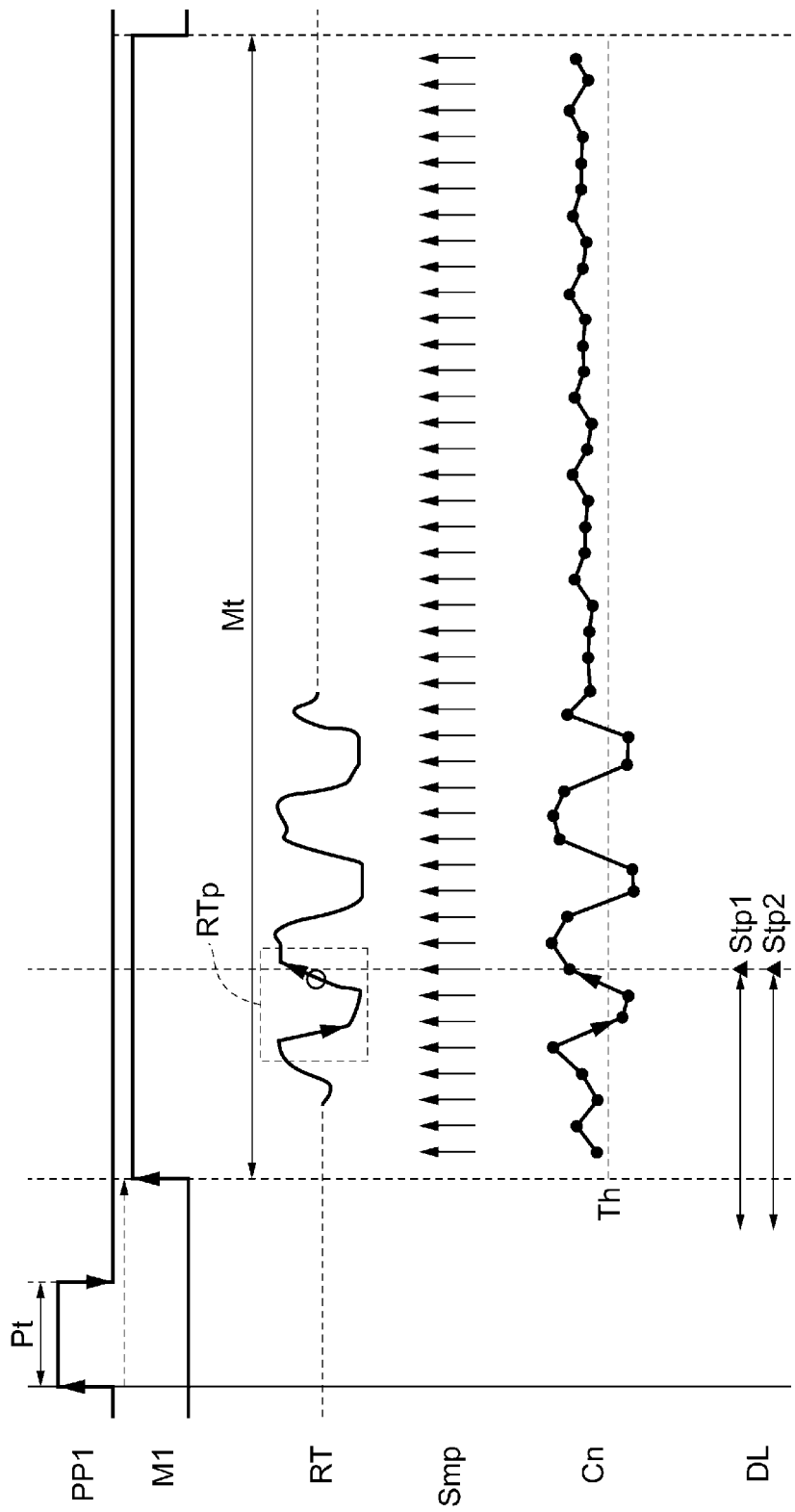
FIG. 5 is a timing graph illustrating an operation of the counter measurement unit and a periphery thereof illustrated in FIG. 1.

Next, with reference to FIG. 5, an example of an operation of the counter measurement unit and a periphery thereof according to the embodiment is described. FIG. 5 is a timing graph illustrating an operation of the counter measurement unit 32 and a periphery thereof illustrated in FIG. 1.

First, the sensor device 100 roughly measures a time elapsing from a start of light emission, by a counter method in which the clock signal is used, over an entire measurement range of the sensor device 100. The rough measurement is performed with the nanosecond-order resolution. Then, a periphery of the measurement point estimated in the rough measurement is finely measured by a TDC delay line method. Specifically, a stop signal of fine measurement on the periphery of the measurement point searched in the rough measurement is output, and thereby a time to the periphery of the target object TA can be measured with high precision. The fine measurement is performed with the picosecond-order resolution.

<Rough Measurement>

As illustrated in FIG. 5, first, the light projecting element 11 emits a projection pulse PP1 having a pulse width Pt. A constant period Mt from emission of the light projecting pulse PP1 is set to a measurement section M1 of the projection pulse PP1. The counter measurement unit 32 performs sampling of binarized information of the binarized signal RT with the sampling signal Smp based on the clock signal, within the measurement section M1. The binarized information is subjected to the sampling on the basis of the clock signal and thus is associated with time information. The binarized signal RT is, for example, a signal obtained by inputting a signal from the light receiving element 21 by low voltage differential signaling (LVDS). A partial waveform RTp of the binarized signal RT represents a reflected wave corresponding to the projection pulse PP1.

A counter integration signal Cn is a signal obtained by measuring the binarized information of the binarized signal RT with the sampling signal Smp to the predetermined number of times (n times) of integration and integrating the binarized information obtained by n times of integration for each clock. The counter measurement unit 32 confirms a rising point of the counter integration signal Cn which first intersects with a determination threshold value Th, as a measurement point, and the counter measurement unit outputs a stop signal at the rising point. However, confirmation of the measurement point is described as an example, and another characteristic point such as a falling start point may be confirmed, instead of the rising point. In the rough measurement, a search for a new waveform is performed from an old waveform in time series, and a characteristic point of the binarized signal RT is found. Moreover, it is also possible to search for the old waveform from the new waveform in time series and to find a characteristic point of the binarized signal RT.

<Fine Measurement>

The TDC delay line measurement unit 33 performs fine measurement of a time immediately before the stop signal on the basis of the above-described stop signal obtained in the rough measurement. The TDC delay lines 301, 302, 303, and 304 receive the stop signals Stp1, Stp2, Stp3, and Stp4 and perform fine measurement on the periphery of the measurement point in delay line measurement DL. A stop timing of the fine measurement on the periphery of the measurement point searched in the rough measurement is applied, and thereby the time to the periphery of the target object TA can be measured with high precision. Hence, the measurement precision of the distance to the periphery of the target object TA can be improved without increasing a circuit size, and the range of a detectable distance can be widened.

In the fine measurement, an integration result of the binarized signal RT acquired from delay lines is subjected to a filtering process, and then a search for an old waveform from a new waveform in time is performed. Hence, it is possible to search for a measurement point at a point having as high a signal level as possible, and it is possible to reduce an effect of noise such as external light as much as possible. Moreover, it is also possible to search for the new waveform from the old waveform in time series in the fine measurement.

In addition, the binarized signals RT are acquired at a plurality of delay lines connected to each other in parallel, and thereby the number of times of sampling performed in the same time can be more increased, compared to a case of a single row of delay lines. Consequently, the sensor device 100 can be suitable for a high-speed output.

In addition, the following processes are performed together, and thereby the sensor device 100 can operate with a rapid sensor response and stable measurement.

In the first measurement, it is possible to measure a distance to the target object TA by using results of the rough measurement and the fine measurement by a user operation. Hence, it is possible to increase an output response speed of the sensor device 100.

After a target object is not spotted, and an error of insufficient light quantity occurs, in a case or the like of measuring the target object flowing on a line in a factory, a state where the target object is present again is encountered, in some cases. In this case, the fine measurement is performed using the result of the previous rough measurement, and thereby it is possible to increase the output response speed of the sensor device 100.

In addition, when a light quantity is insufficient in the rough measurement, the fine measurement can be performed on the basis of a result of the previous rough measurement. In addition, a measurement error is not set to occur when a light quantity is insufficient in the rough measurement, and only a fine measurement error can be set as the measurement error.

In addition, an amplitude reference value of the integrated waveform for determining light quantity insufficiency in the rough measurement and the fine measurement can be determined on the basis of an amplitude of an integrated waveform set by a user operation.

Figure 6:
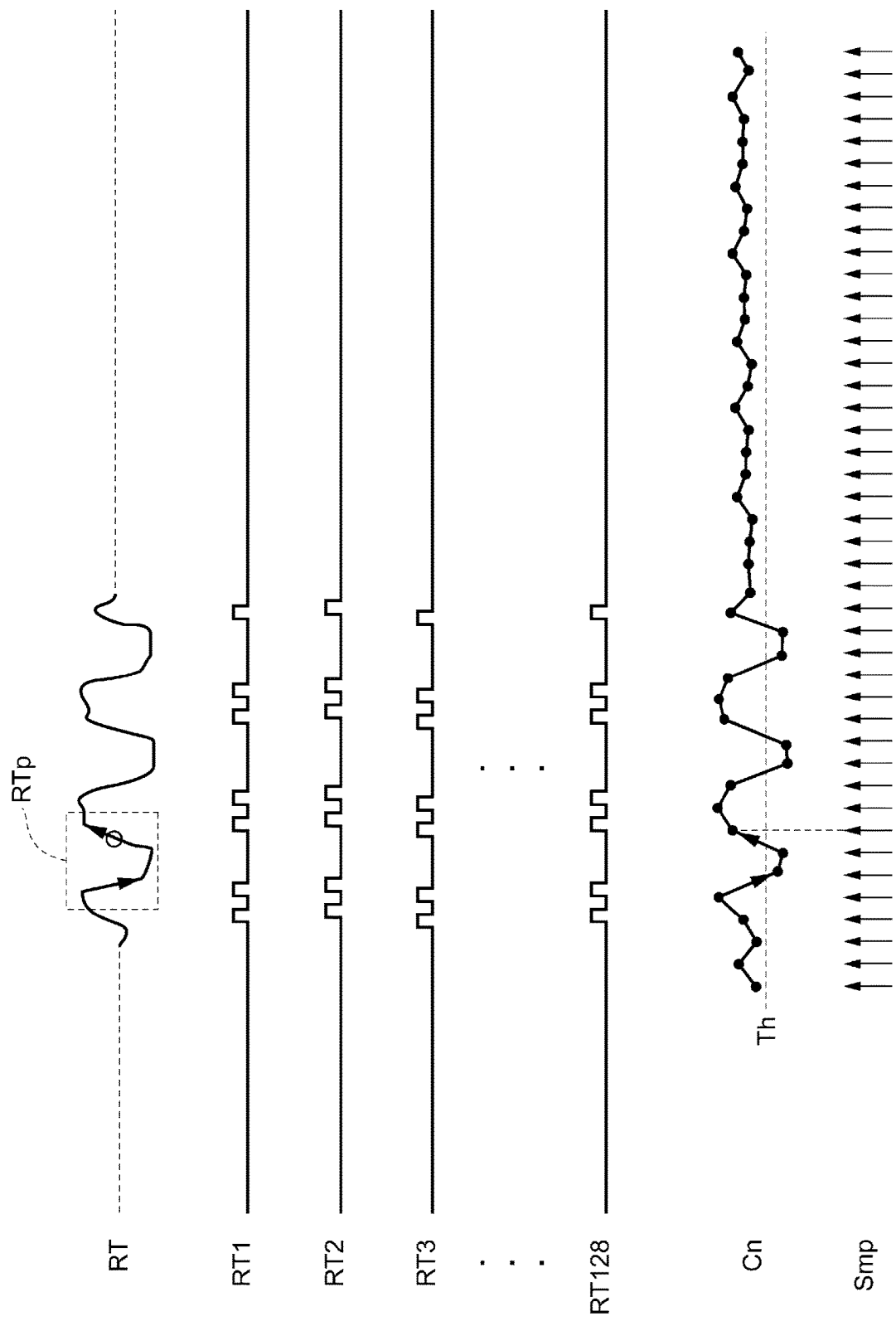
FIG. 6 is a timing graph illustrating an operation of a rough measurement of the counter measurement unit illustrated in FIG. 1.

Next, with reference to FIG. 6, an example of an operation of the counter measurement unit according to the embodiment will be described. FIG. 6 is a timing graph illustrating an operation of the rough measurement of the counter measurement unit 32 illustrated in FIG. 1.

As illustrated in FIG. 6, the binarized signal incorporation unit 321 incorporates the binarized signal RT on the basis of a timing of the start signal Str. The binarized signal RT corresponds to the waveform illustrated in FIG. 5. The binarized signal RT is binarized, and binarized signals RT1, RT2, ..., and RT128 (hereinafter, collectively referred to as the "binarized signal RT) is incorporated sequentially to the binarized signal incorporation unit 321 according to the timing of the start signal Str. The counter integration signal Cn represents the binarized signals RT accumulated in the signal accumulation unit 322 and corresponds to the waveform illustrated in FIG. 5.

The stop signal determination unit 323 outputs the sampling signal Smp based on the clock signal to the signal accumulation unit 322 that accumulates the counter integration signals Cn. The stop signal determination unit 323 confirms a rising point of the counter integration signal Cn, which first intersects with the determination threshold value Th, as a measurement point, and the stop signal determination unit outputs a stop signal Stp at the rising point. The determination threshold value Th is variably set depending on n times of measurement cycles of the binarized signals RT, such as 128 times in the example illustrated in FIG. 6. The determination threshold value Th is preferably set to a half of n times of measurement cycles of the binarized signals RT; however, the determination threshold value may not be set to a half thereof. When the target object TA is disposed at a long distance from the sensor device 100, or when the target object TA has a low reflectance, the determination threshold value Th is set to a value larger than a half of n times of measurement cycles of the binarized signals RT. Hence, more sensitive detection of a characteristic point of the binarized signal RT represented by the counter integration signal Cn can be performed.

Figure 7:
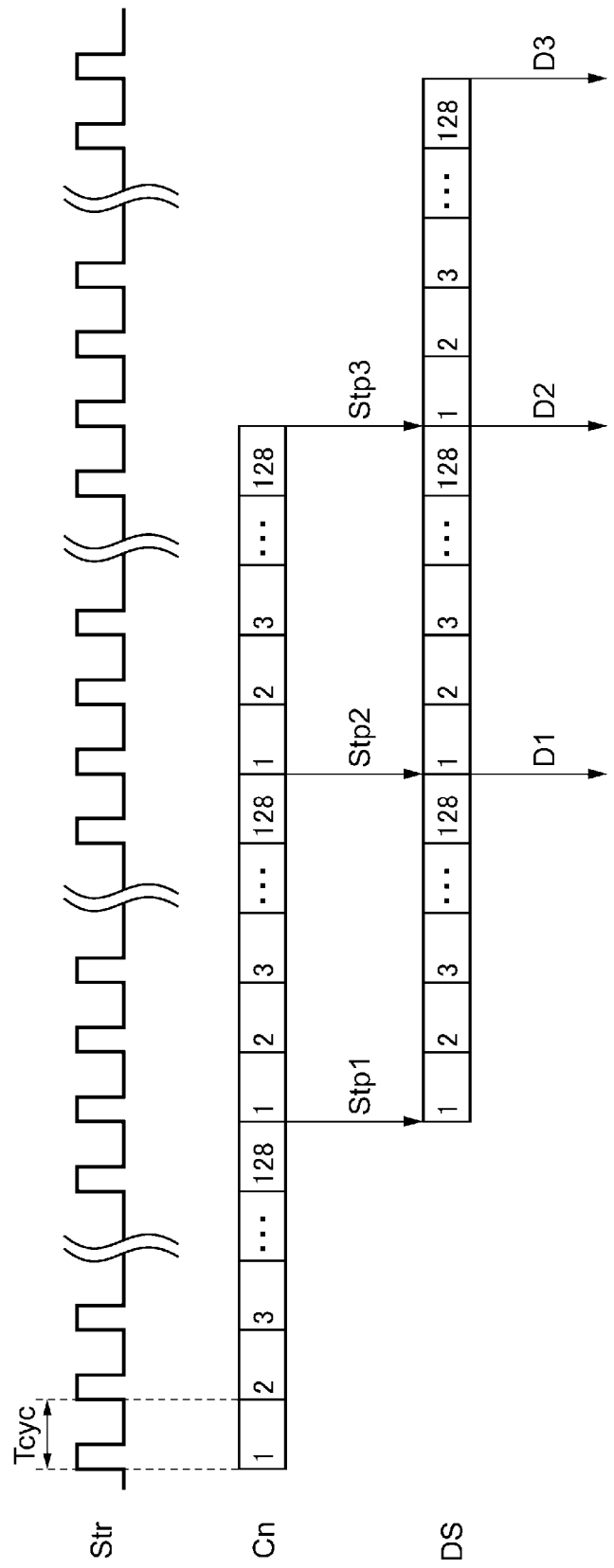
FIG. 7 is a timing graph illustrating an overview of an operation of the TDC delay line measurement unit and a periphery thereof illustrated in FIG. 1.

Next, with reference to FIG. 7, an example of an operation of the TDC delay line measurement unit and a periphery thereof according to the embodiment will be described. FIG. 7 is a timing graph illustrating an overview of an operation of the TDC delay line measurement unit 33 and the periphery thereof illustrated in FIG. 1. Moreover, FIG. 7 illustrates an operation performed in a case where the number of times of counter measurement in the counter measurement unit 32 is equal to the number of times of integration in the TDC delay line measurement unit 33 (128 times in FIG. 7; however, changeable). In addition, in order to shorten a response time in the counter measurement unit 32 or the TDC delay line measurement unit 33, it is also possible to reduce one of the numbers of times and perform measurement. When the number of times of the counter measurement is not equal to the number of times of the integration, a waiting time is set in the counter measurement or the delay line measurement, and thus measurement efficiency can be reduced.

As illustrated in FIG. 7, the start signal Str corresponding to the clock signal Ck which is supplied to all of the components of the FPGA 30 from the PLL 47 has a cycle Tcyc, for example. In the counter integration signal Cn of the counter measurement unit 32, the binarized signals RT are incorporated and integrated 128 times on the basis of the timing of the start signal Str. The stop signal determination unit 323 confirms a rising point in integrated value of the binarized signals RT which first intersects with the determination threshold value Th every 128 times of the clock cycles, as a measurement point, and the stop signal determination unit outputs the stop signals Stp1, Stp2, Stp3, and Stp4 simultaneously to the TDC delay lines 301, 302, 303, and 304, respectively.

In a delay signal group DS in the TDC delay line measurement unit 33, the delay line output signal D1$j$ is output in synchronization with the stop signal Stp1 in the first TDC delay line 301. The buffer 315 synchronizes with the next stop signal Stp2 to output the delay line output signal D1 obtained by integrating the delay line output signal D1$j$ 128 times, and a delay line output signal D2$j$ is input from the second TDC delay line 302. The buffer 315 synchronizes with the next stop signal Stp3 to output the delay line output signal D2 obtained by integrating the delay line output signal D2$j$ 128 times, and a delay line output signal D3$j$ is input from the third TDC delay line 303. Hereinafter, this is true of the delay line output signals D3 and D4 output from the TDC delay lines 303 and 304, respectively, and thus the description thereof is omitted.

As described above, the TDC delay line measurement is performed on the basis of a stop timing determined by the number of clock cycles, and thereby a time from the start of light projection to a light receiving measurement point can be obtained. As described with reference to FIG. 1, the generated delay line output signals D1, D2, D3, and D4 are integrated in the waveform integration unit 34, and the distance to the target object TA is measured through the stage number calculation unit 37 and the distance conversion unit 38.

Figure 8:
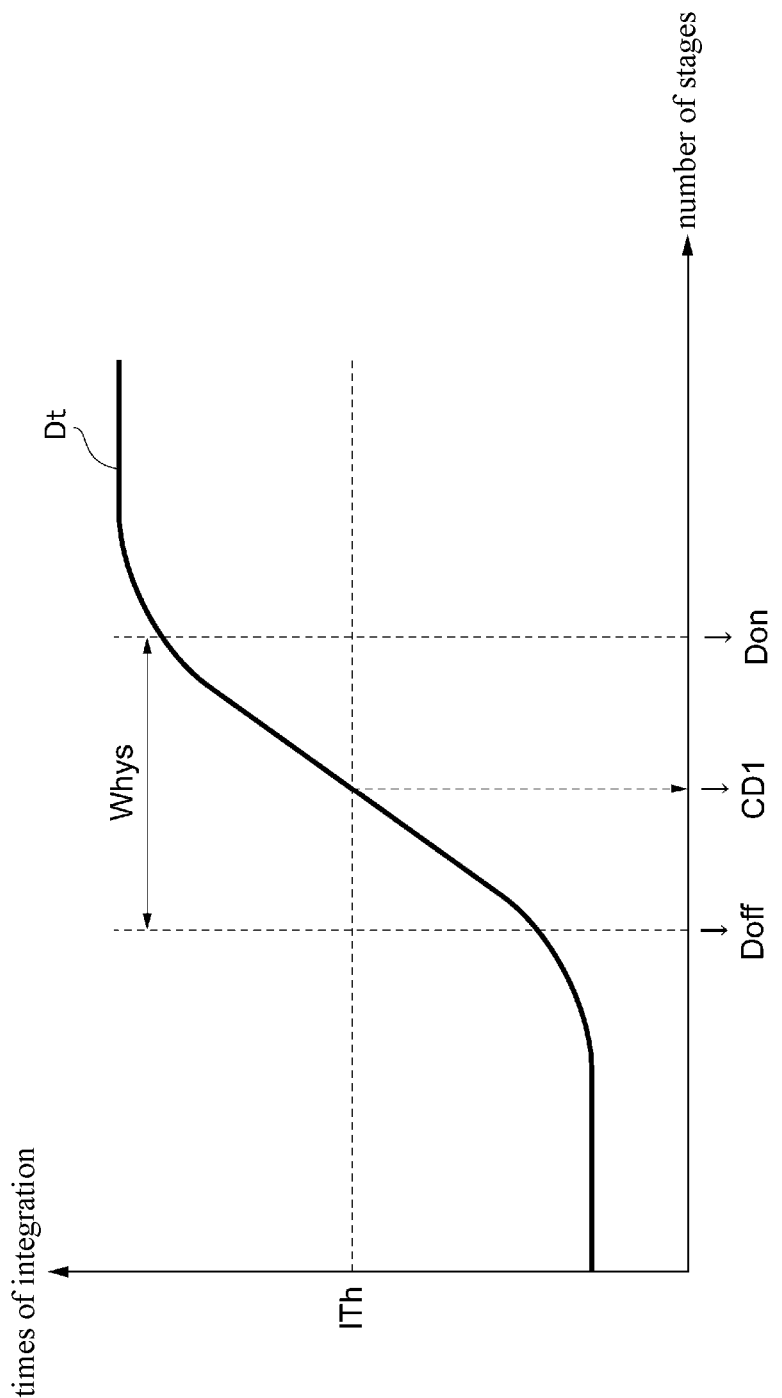
FIG. 8 is a waveform graph illustrating a processing result of a waveform integration unit and a periphery thereof illustrated in FIG. 1, when the target object has a relatively low reflectance.
Figure 9:
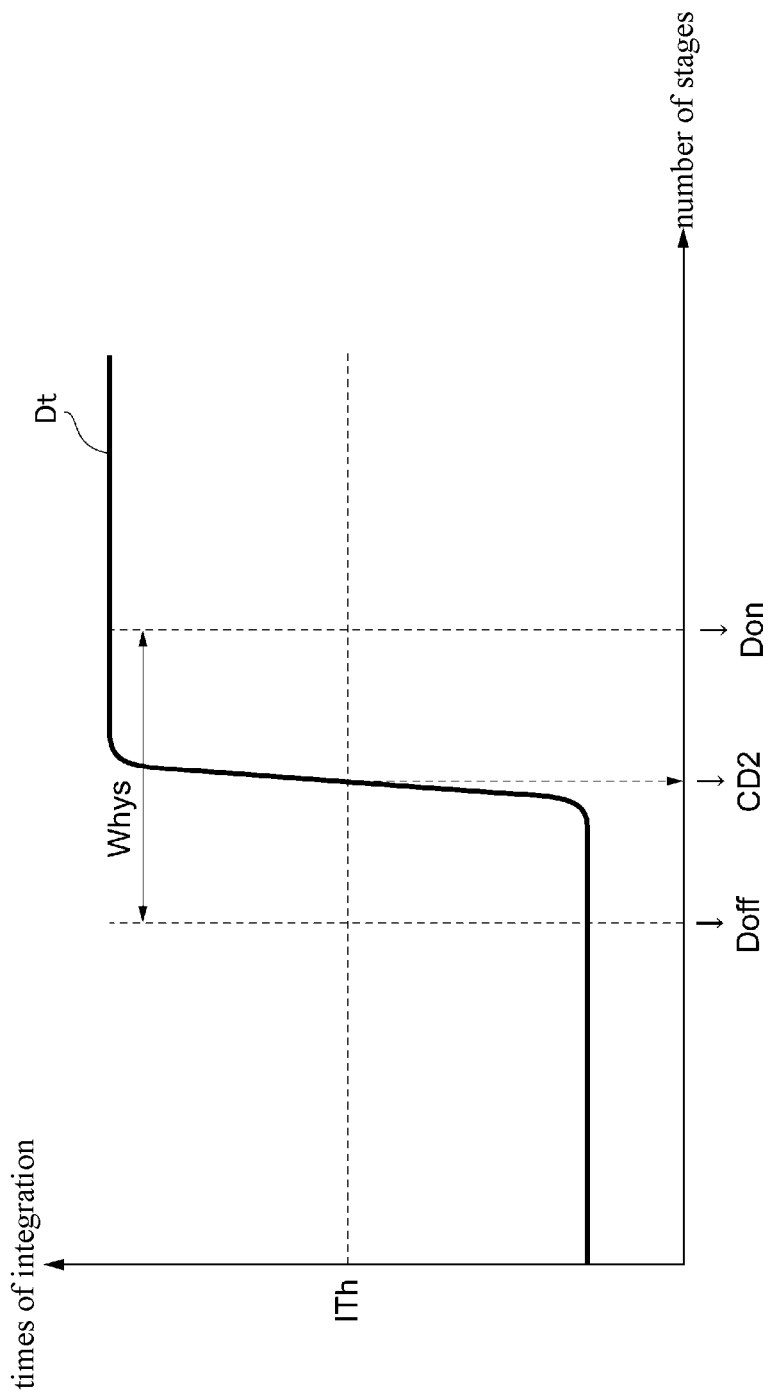
FIG. 9 is a waveform graph illustrating a processing result of the waveform integration unit and the periphery thereof illustrated in FIG. 1, when the target object has a relatively high reflectance.

Next, with reference to FIGS. 8 and 9, an example of an operation of the waveform integration unit 34 and a periphery thereof according to the embodiment will be described. FIG. 8 is a waveform graph illustrating a processing result of the waveform integration unit 34 and a periphery thereof illustrated in FIG. 1, when the target object TA has a relatively low reflectance. FIG. 9 is a waveform graph illustrating a processing result of the waveform integration unit 34 and the periphery thereof illustrated in FIG. 1, when the target object has a relatively high reflectance.

The integration signal Dt output by the waveform integration unit 34 is an integration signal of all of the delay line output signals D1 to D4. The integration signal Dt may be subjected to the filtering process, that is, the smoothing with a movement average.

Here, an operation of a virtual sensor device is described with reference to FIGS. 8 and 9. The virtual sensor device has the same configuration as the sensor device 100, and thus the illustration and the description thereof is omitted. In the virtual sensor device, a stage number calculation unit calculates the number of stages of delay elements from an intersection of the integration signal Dt with an integration threshold value ITh. A distance conversion unit converts the number of stages of the delay elements into a distance to a target object. A determination unit compares converted distances CD1 and CD2 to an off-point distance Doff and an on-point distance Don and determines presence or absence of the target object. For example, in a state where the target object is not detected, the determination unit determines that the target object is present (detected) when the converted distances CD1 and CD2 are longer than the on-point distance Don. In addition, in a state where the target object TA is detected, the determination unit determines that the target object is not present (not detected) when the converted distances CD1 and CD2 are shorter than the off-point distance Doff. A width (difference) between the off-point distance Doff and the on-point distance Don is set as a hysteresis width Whys in advance.

As illustrated in FIG. 8, when the target object TA has a low reflectance, the integration signal Dt has a gentle inclination, and the fluctuation (variation) of the converted distance CD1 tends to increase. The hysteresis width Whys of the off-point distance Doff and the on-point distance Don needs to be widely set. On the other hand, as illustrated in FIG. 9, when the target object TA has a high reflectance, the integration signal Dt has a steep inclination, and the fluctuation (variation) of the converted distance CD2 tends to decrease. Therefore, it is desirable that the hysteresis width Whys of the off-point distance Doff and the on-point distance Don be narrow. However, it is inconvenient to set the hysteresis width Whys according to the reflectance of the target object TA, and thus it is particularly difficult to set the hysteresis width at a line in a factory where target objects having different reflectance from each other are mixed. Besides, when the hysteresis width Whys is set depending on the target object TA having the low reflectance, the hysteresis width Whys is wide, as illustrated in FIG. 9, and thus the converted distance CD2 is unlikely to exceed the off-point distance Doff and the on-point distance Don. Therefore, the detection precision of the target object TA is likely to depend on the reflectance of the target object TA.

Figure 10:
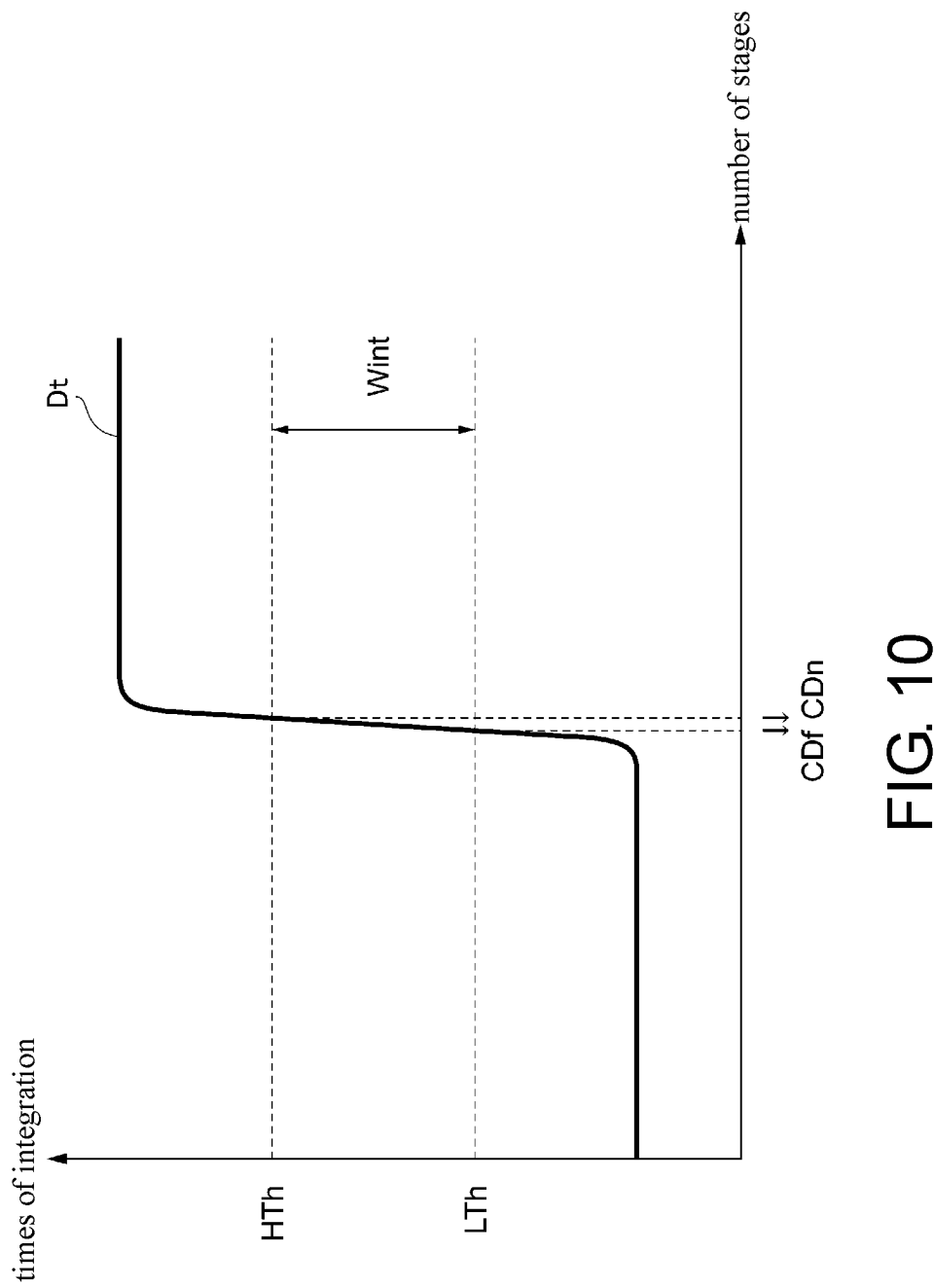
FIG. 10 is a waveform graph illustrating a processing result of a stage number calculation unit and a periphery thereof illustrated in FIG. 1, when the target object has a relatively high reflectance.
Figure 11:
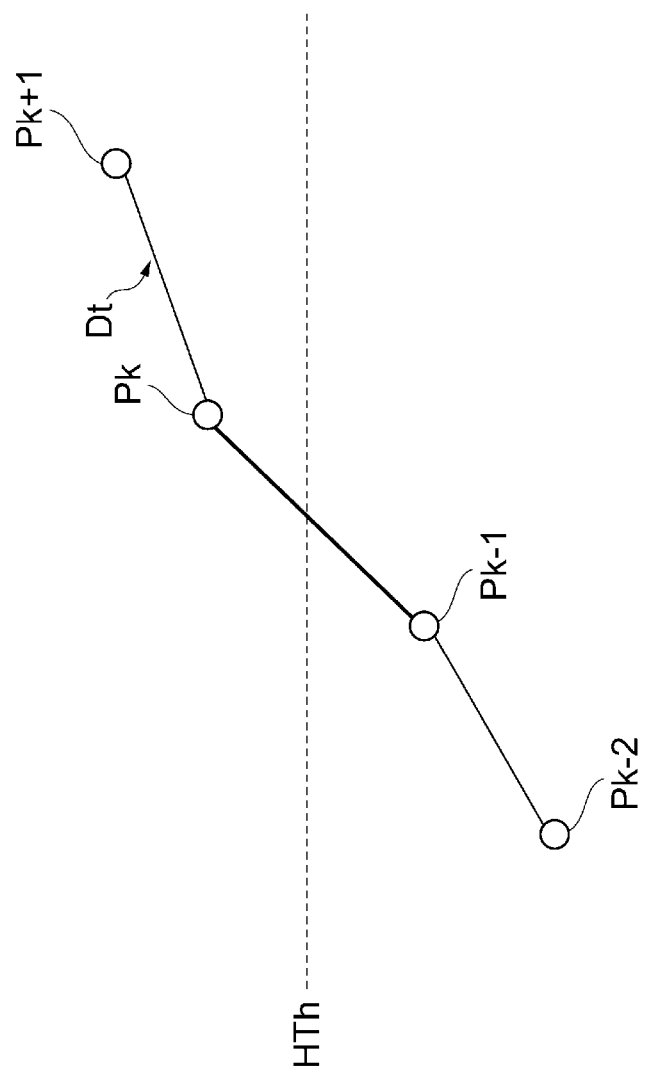
FIG. 11 is a partially enlarged graph illustrating the vicinity of an intersection of an integration signal with a high threshold value illustrated in FIG. 10.

Next, with reference to FIGS. 10 and 11, an example of an operation of the stage number calculation unit and a periphery thereof according to the embodiment will be described. FIG. 10 is a waveform graph illustrating a processing result of the stage number calculation unit 37 and a periphery thereof illustrated in FIG. 1, when the target object TA has the relatively high reflectance. FIG. 11 is a partially enlarged graph illustrating the vicinity of an intersection of the integration signal Dt with a high threshold value HTh illustrated in FIG. 10.

As illustrated in FIG. 10, in the sensor device 100, the high threshold value HTh and a low threshold value LTh are set with respect to an amplitude, that is, the number of times of integration of the integration signal Dt. A width (difference) between the high threshold value HTh and the low threshold value LTh is set by a predetermined value as an integration times width Wint. The stage number calculation unit 37 calculates the number of stages of delay elements from respective intersections of the high threshold value HTh and the low threshold value LTh with the integration signal Dt. The distance conversion unit 38 converts the number of stages of delay elements into a near-side distance value CDn and a far-side distance value CDf. Besides, the determination unit 51 determines presence or absence of the target object TA on the basis of a predetermined distance threshold value and a distance value calculated from the converted near-side distance value CDn and far-side distance value CDf. Here, as illustrated in FIG. 10, when the target object TA has a high reflectance, the integration signal Dt has a steep inclination, and thus a width between the near-side distance value CDn and the far-side distance value CDf is relatively narrow, even when the difference (integration times width Wint) between the high threshold value HTh and the low threshold value LTh is constant. On the other hand, when the target object TA has a low reflectance, the integration signal Dt has a gentle inclination, and thus the width between the near-side distance value CDn and the far-side distance value CDf is relatively wide, even when the difference (integration times width Wint) between the high threshold value HTh and the low threshold value LTh is constant.

In this manner, the high threshold value HTh and the low threshold value LTh are set with respect to the number of times of integration of the integration signal Dt, the number of stages of delay elements from respective intersections of the high threshold value HTh and the low threshold value LTh with the integration signal Dt is calculated, the number of stages of delay elements is converted into the near-side distance value CDn and the far-side distance value CDf, and thereby it is possible to change the width between the near-side distance value CDn and the far-side distance value CDf according to the reflectance. Consequently, the presence or absence of the target object TA is determined on the basis of the predetermined distance threshold value and the distance value calculated from the converted near-side distance value CDn and far-side distance value CDf, and thereby detection of the target object TA can be performed with high precision irrespective of the reflectance of the target object TA.

In the embodiment, an example is described in which the high threshold value HTh and the low threshold value LTh are set with respect to the number of times of integration of the integration signal Dt, the number of stages of delay elements from respective intersections of the high threshold value HTh and the low threshold value LTh with the integration signal Dt is calculated, the number of stages of delay elements is converted into the near-side distance value CDn and the far-side distance value CDf; however, the embodiment is not limited thereto. For example, the counter integration signal Cn may be used instead of the integration signal Dt, and thus the high threshold value and the low threshold value may be set with respect to the number of times of integration of the counter integration signal Cn. In this case, sampling numbers of the sampling signals Smp from the respective intersections of the high threshold value and the low threshold value with the counter integration signal Cn are calculated, and the sampling numbers of the respective sampling signals Smp are converted into the near-side distance value and the far-side distance value.

It is preferable that the respective intersections of the high threshold value HTh and the low threshold value LTh with the integration signal Dt be obtained by sub-pixel processing. In other words, as illustrated in FIG. 11, the integration signal Dt is a collection of discrete points (data) Pk−2, Pk−1, Pk, and Pk+1 from a micro-perspective. The stage number calculation unit 37 performs the sub-pixel processing using data obtained immediately before the intersection of the high threshold value HTh with the integration signal Dt, that is, the point Pk−1 in the example illustrated in FIG. 11, and data obtained immediately behind the intersection of the high threshold value HTh with the integration signal Dt, that is, the point Pk in the example illustrated in FIG. 11, and the stage number calculation unit obtains the intersection of the high threshold value HTh with the integration signal Dt. Besides, the stage number calculation unit 37 calculates the number of stages of delay elements from the obtained intersections. Similarly, the stage number calculation unit 37 also calculates the intersection of the low threshold value LTh with the integration signal Dt and calculates the number of stages of delay elements from the obtained intersection. For example, it is possible to calculate a distance with resolution of one or more stages of delay elements. Consequently, measurement precision of the distance to the periphery of the target object TA can be improved.

Figure 12:
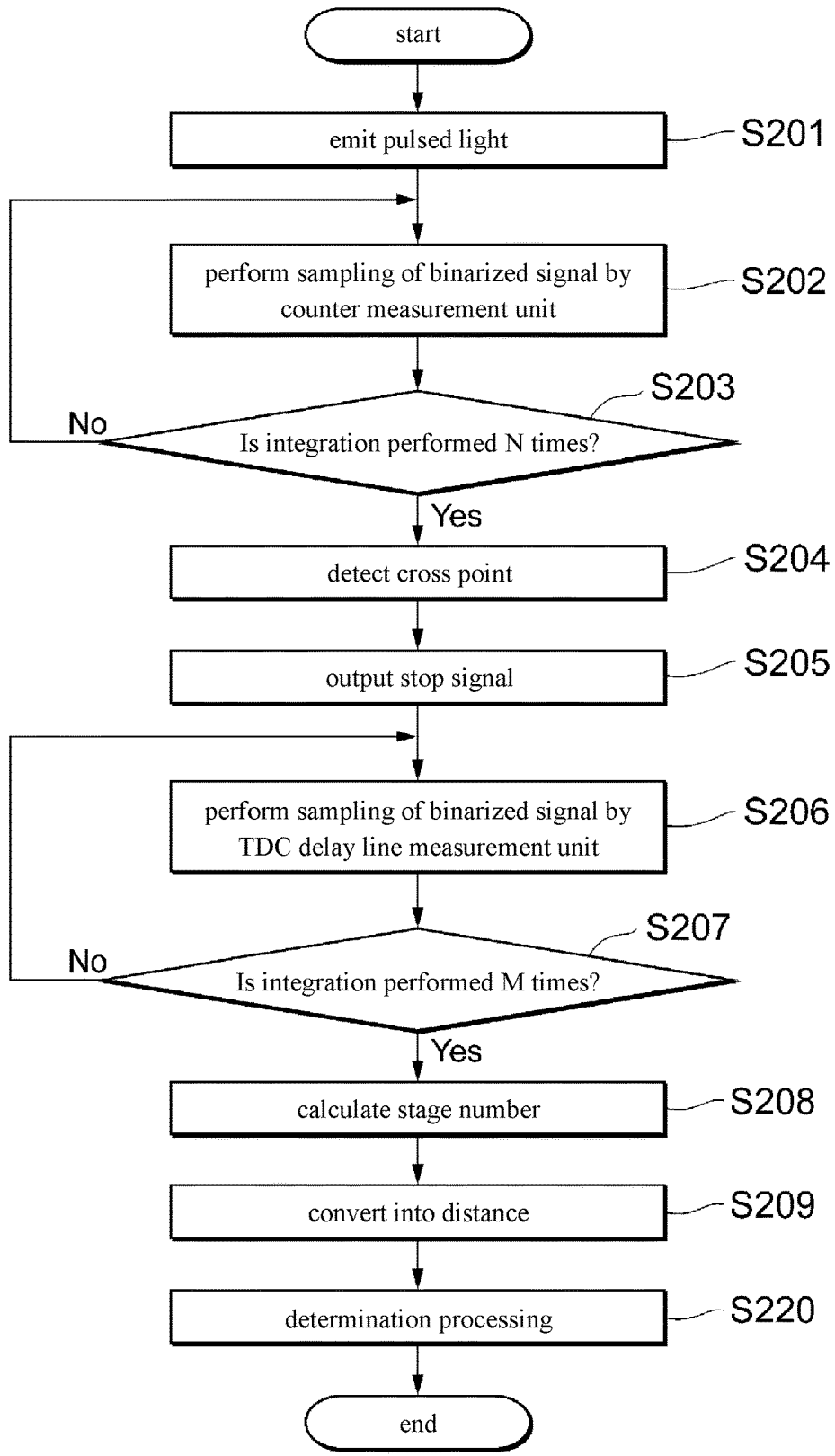
FIG. 12 is a flowchart illustrating a schematic operation of the sensor device according to the embodiment.
Figure 13:
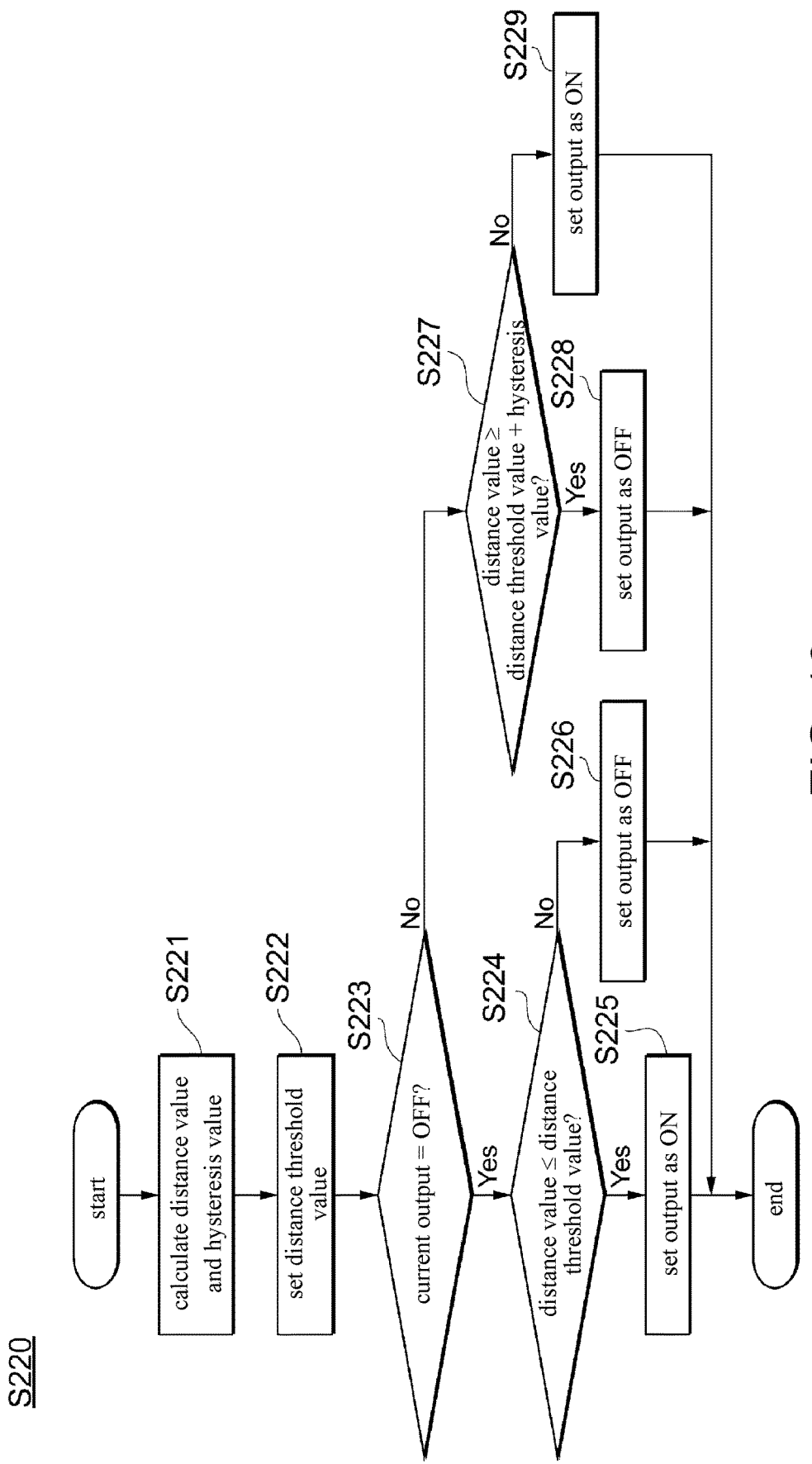
FIG. 13 is a flowchart illustrating determination processing illustrated in FIG. 12.

Next, with reference to FIGS. 12 and 13, an example of an operation of the sensor device according to the embodiment will be described. FIG. 12 is a flowchart illustrating a schematic operation of the sensor device 100 according to the embodiment. FIG. 13 is a flowchart illustrating determination processing illustrated in FIG. 12. Hereinafter, a case where the counter measurement in the counter measurement unit 32 is equal to the number of times of integration in the TDC delay line measurement unit 33 will be described.

For example, when the sensor device 100 is supplied with power supply and is started, the sensor device executes detection processing S200 illustrated in FIG. 12. Hereinafter, a case where the counter measurement in the counter measurement unit 32 is equal to the number of times of integration in the TDC delay line measurement unit 33 will be described.

First, the light projecting element 11 emits pulsed light toward the target object TA (S201). Next, the counter measurement unit 32 performs sampling of the binarized information of the binarized signals RT (S202). Next, the counter measurement unit 32 determines whether or not the sampling is integrated N times (S203). As a result of determination in Step S203, when the sampling is not integrated N times, the process returns to Step S202, and the counter measurement unit 32 repeats the sampling of the binarized signal RT until the sampling is integrated N times.

As a result of the determination in Step S203, when the sampling is integrated N times, the counter measurement unit 32 detects a cross point at which the counter integration signal Cn intersects with the determination threshold value Th (S204). Next, the counter measurement unit 32 confirms a measurement point on the basis of the cross point and outputs a stop signal at that time point (S205). Next, the TDC delay line measurement unit 33 performs sampling of the binarized information of the binarized signals RT (S206). Next, the TDC delay line measurement unit 33 determines whether or not the sampling is integrated M times (S207). As a result of determination in Step S207, when the sampling is not integrated M times, the process returns to Step S206, and the TDC delay line measurement unit 33 repeats the sampling of the binarized signal RT until the sampling is integrated M times.

Next, the stage number calculation unit 37 calculates the number of stages of delay elements from the respective intersections of the high threshold value HTh and the low threshold value LTh with the integration signal Dt (S208). Next, the distance conversion unit 38 converts the number of stages of delay elements into the near-side distance value CDn and the far-side distance value CDf (S209). Next, the determination unit 51 executes the following determination processing S220. After end of the determination processing S220, the sensor device 100 ends the detection processing S200.

<Determination Processing S220> when the determination processing S220 is started, the determination unit 51 first calculates a distance value CDa and a hysteresis value Vhys on the basis of the near-side distance value CDn and the far-side distance value CDf which are input from the distance conversion unit 38 through the interface unit 41 of the FPGA 30, as illustrated in FIG. 13 (S221).

The distance value CDa is an average value of the near-side distance value CDn and the far-side distance value CDf and is expressed as Expression (2) below.

Distance Value $CDa$=(Near-Side Distance Value $CDn$+Far-Side Distance Value $CDf$)/2   Expression (2)

In the embodiment, an example in which the distance value CDa is the average value of the near-side distance value CDn and the far-side distance value CDf is described; however, the embodiment is not limited thereto. The distance value CDa may be a value calculated from the near-side distance value CDn and the far-side distance value CDf or may be a value other than the average value.

The hysteresis value Vhys is expressed as in Expression (3) below by using a magnification adjustment value Vm and an offset adjustment value Vo stored in a memory or the like of the controller 50 in advance.

Hysteresis Value $Vhys=\{(\text{Far-Side Distance Value } CDf-\text{Near-Side Distance Value } CDn) \times Vm\}+Vo$   Expression (3)

Moreover, the magnification adjustment value Vm and the offset adjustment value Vo are not limited to a case where a value stored in advance is used. For example, the magnification adjustment value Vm and the offset adjustment value Vo may be changeable depending on an operation of the operation unit 70 by a user.

Next, the determination unit 51 sets a value input by a user operation of the operation unit 70, as a distance threshold value (S222).

Next, the determination unit 51 determines whether or not a current output is OFF (S223). A case where output is OFF means that the target object TA is not present, and a case where output is ON means that the target object is present. The current output indicates a value, that is, ON or OFF, set as a result of the previous determination processing S220, except for a case of the first execution of the determination processing S220. In case the determination processing S220 is first executed, OFF is set to a default value of output.

As a result of determination in Step S223, when a current output is OFF, the determination unit 51 compares the distance value CDa calculated in Step S221 to the distance threshold value set in Step S222 and determines whether or not the distance value CDa is equal to or smaller than the distance threshold value (S224). As a result of determination in Step S224, when the distance value CDa is equal to or smaller than the distance threshold value, the determination unit 51 sets the output as ON (S225). On the other hand, as a result of determination in Step S224, when the distance value CDa is not equal to or smaller than the distance threshold value, that is, when the distance value CDa is larger than the distance threshold value, the determination unit 51 sets the output as OFF (S226).

As a result of determination in Step S223, when the current output is not OFF, that is, when the current output is ON, determination that the target object is present (target object is detected) is performed as a result of the previous determination processing S220. Hence, the determination unit 51 compares the distance value CDa to a sum (total) of the distance threshold value and the hysteresis value Vhys and determines whether or not the distance value CDa is equal to or larger than the sum (total) of the distance threshold value and the hysteresis value Vhys (S227). In this manner, when the previous determination result indicates the presence of the target object, the presence or absence of the target object is determined on the basis of the hysteresis value Vhys based on an absolute value of a difference between the near-side distance value CDn and the far-side distance value CDf, the distance value CDa calculated from the near-side distance value CDn and the far-side distance value CDf, and the predetermined distance threshold value, for example, the distance value CDa is compared to a sum of the predetermined distance threshold value and the hysteresis value, and thereby it is possible to have a width (margin) in determination by the hysteresis value Vhys, and it is possible to inhibit too sensitive reaction to a change in distance value CDa calculated from the near-side distance value CDn and the far-side distance value CDf, in determination performed after the determination of the presence of the target object.

As a result of the determination in Step S227, when the distance value CDa is equal to or larger than the sum of the distance threshold value and the hysteresis value Vhys, the determination unit 51 sets the output as OFF (S228). On the other hand, as a result of the determination in Step S227, when the distance value CDa is not equal to or larger than the sum of the distance threshold value and the hysteresis value Vhys, that is, when the distance value CDa is smaller than the sum of the distance threshold value and the hysteresis value Vhys, the determination unit 51 sets the output as ON (S229).

After Step S225, Step S227, Step S228, or Step S229, the determination unit 51 ends the determination processing S220.

Moreover, FIG. 13 illustrates an example in which the determination unit 51 calculates the distance value CDa and the hysteresis value Vhys in Step S221; however, the embodiment is not limited thereto. For example, the distance conversion unit 38 of the FPGA 30 may calculate the distance value CDa and the hysteresis value Vhys, and the values may be input to the determination unit 51 via the interface unit 41. In addition, in each determination in Step S224 and Step S227, whether or not to include a case of equal values may be changeable by setting.

In the embodiment, a case where light is used as a measurement medium of the sensor device 100 is described as an example; however, the invention is not limited thereto. For example, the measurement medium of the sensor device 100 may be an electromagnetic wave, a sound wave, or the like. When the electromagnetic wave or the sound wave is used, it is possible to measure not only a distance of the target object TA but also a change in distance to the target object.

In addition, in the embodiment, an example in which the sensor device 100 performs both the rough measurement and the fine measurement is described; however, the embodiment is not limited thereto. For example, the sensor device may be configured to perform only one of the rough measurement and the fine measurement.

As described above, the exemplary embodiments of the present invention are described. According to the sensor device 100 and the detection method according to an embodiment of the present invention, the near-side distance value CDn and the far-side distance value CDf from the respective intersections of the high threshold value HTh and the low threshold value LTh with the integration signal Dt are calculated, and the presence or absence of the target object TA is determined on the basis of a predetermined distance threshold value and the distance value CDa calculated from the near-side distance value CDn and the far-side distance value CDf. Here, as illustrated in FIG. 10, when the target object TA has the high reflectance, the integration signal Dt has a steep inclination, and thus a width between the near-side distance value CDn and the far-side distance value CDf is relatively narrow, even when a difference (integration times width Wint) between the high threshold value HTh and the low threshold value LTh is constant. On the other hand, when the target object TA has the low reflectance, the integration signal Dt has a gentle inclination, and thus a width between the near-side distance value CDn and the far-side distance value CDf is relatively wide, even when the difference (integration times width Wint) between the high threshold value HTh and the low threshold value LTh is constant. Hence, the high threshold value HTh and the low threshold value LTh are set with respect to the number of times of integration of the integration signal Dt, the number of stages of delay elements from the respective intersections of the high threshold value HTh and the low threshold value LTh with the integration signal Dt is calculated, and the number of stages of delay elements is converted into the near-side distance value CDn and the far-side distance value CDf, and thereby it is possible to change the width between the near-side distance value CDn and the far-side distance value CDf according to the reflectance. Consequently, the presence or absence of the target object TA is determined on the basis of the predetermined distance threshold value and the distance value CDa calculated from the converted near-side distance value CDn and far-side distance value CDf, and thereby the detection of the target object TA can be performed with high precision irrespective of the reflectance of the target object TA.

The embodiments described above are provided to achieve an easy understanding of the present invention and are not provided to limit an understanding of the present invention. All of the elements included in the embodiment, arrangement, a material, a condition, a shape, a size, or the like of the elements are not limited to the exemplified example and can be appropriately modified. In addition, configurations included in different embodiments from each other can be partially replaced with each other or can be combined together.

APPENDIX

1. The sensor device (100) includes: a light emitting unit (10) that transmits a transmission signal toward a target object (TA); a light receiving unit (20) that receives a reflected signal of the transmission signal and generates a binarized signal (RT); a TDC delay line measurement unit (33) and a waveform integration unit (34) that generate waveform data indicating a change in the binarized signal (RT) over time and integrate a plurality of pieces of the waveform data to generate integrated waveform data; a stage number calculation unit (37) and a distance conversion unit (38) that calculate a near-side distance value (CDn) and a far-side distance value (CDf) from respective intersections of a high threshold value (HTh) and a low threshold value (LTh) with the integrated waveform data; and a determination unit (51) that determines presence or absence of the target object (TA) on the basis of a predetermined distance threshold value and a distance value (CDa) calculated from the near-side distance value (CDn) and the far-side distance value (CDf).

7. A detection method for detecting a target object (TA), the detecting method includes: a signal transmission step of transmitting a transmission signal toward the target object (TA); a signal reception step of receiving a reflected signal of the transmission signal and generating a binarized signal (RT); an integration step of generating waveform data indicating a change in the binarized signal (RT) over time and integrating a plurality of pieces of the waveform data to generate integrated waveform data; a distance calculation step of calculating a near-side distance value (CDn) and a far-side distance value (CDf) from respective intersections of a high threshold value (HTh) and a low threshold value (LTh) with the integrated waveform data; and a determination step of determining presence or absence of the target object (TA), on a basis of a predetermined distance threshold value and the distance value (CDa) calculated from the near-side distance value (CDn) and the far-side distance value (CDf).

What is claimed is:

1. A sensor device comprising:
a light emitting unit that transmits a transmission signal toward a target object;
a light receiving unit that receives a reflected signal of the transmission signal and generates a binarized signal;
a field-programmable gate array that generates waveform data indicating a change in the binarized signal over time, integrates a plurality of pieces of the waveform data to generate integrated waveform data and calculates a first distance value and a second distance value from respective intersections of a first integration threshold value and a second integration threshold value with the integrated waveform data; and
a controller that determines presence or absence of the target object on a basis of a predetermined distance threshold value and a distance value calculated from the first distance value and the second distance value,
wherein the first integration threshold value and the second integration threshold value are set with respect to a number of times of integration of an integration signal.

2. The sensor device according to claim 1,
wherein the controller determines presence or absence of the target object on a basis of the distance value, the predetermined distance threshold value and a hysteresis value based on an absolute value of a difference between the first distance value and the second distance value, when a previous determination result indicates presence of the target object.

3. The sensor device according to claim 1,
wherein the field-programmable gate array calculates the first distance value and the second distance value by performing sub-pixel processing using data obtained immediately in front of and immediately behind the respective intersections of the first integration threshold value and the second integration threshold value with the integrated waveform data.

4. The sensor device according to claim 1,
wherein the field-programmable gate array is configured to:
perform sampling of the binarized signal at a predetermined cycle to generate first waveform data and integrate the first waveform data for a plurality of times of transmission of the transmission signal to generate first integrated waveform data; and
determine a reference timing based on a position of a characteristic point appearing on the first integrated waveform data due to the presence of the target object and generate a stop signal on a basis of the reference timing, and
the field-programmable gate array includes at least one delay circuit unit, the at least one delay circuit unit comprising a plurality of delay elements connected to each other in series,
wherein second waveform data is generated by causing each of the delay elements to incorporate the binarized signal in response to the stop signal, and second integrated waveform data is generated by integrating the second waveform data a plurality of times at the predetermined cycle, and wherein the distance calculation unit calculates the first distance value and the second distance value from the respective intersections of the first integration threshold value and the second integration threshold value with the second integrated waveform data.

5. The sensor device according to claim 4,
wherein the the at least one delay circuit unit comprises a plurality of the delay circuit units connected to each other in parallel and integrates the second integrated waveform data generated by each of the delay circuit units.

6. The sensor device according to claim 4, wherein
the field-programmable gate array has a nanosecond-order resolution, and
the at least one delay circuit unit has a picosecond-order resolution.

7. A detection method for detecting a target object, comprising:
a signal transmission step of transmitting a transmission signal toward the target object;
a signal reception step of receiving a reflected signal of the transmission signal and generating a binarized signal;
an integration step of generating waveform data indicating a change in the binarized signal over time and integrating a plurality of pieces of the waveform data to generate integrated waveform data;
a distance calculation step of calculating a first distance value and a second distance value from respective intersections of a first integration threshold value and a second integration threshold value with the integrated waveform data; and
a determination step of determining presence or absence of the target object on a basis of a predetermined distance threshold value and a distance value calculated from the first distance value and the second distance value,
wherein the first integration threshold value and the second integration threshold value are set with respect to a number of times of integration of an integration signal.

8. The detection method according to claim 7,
wherein the determination step comprises determining presence or absence of the target object, on a basis of the distance value, the predetermined distance threshold value and a hysteresis value based on an absolute value of a difference between the first distance value and the second distance value, when a previous determination result indicates presence of the target object.

9. The detection method according to claim 7,
wherein the distance calculation step comprises calculating the first distance value and the second distance value by performing sub-pixel processing using data obtained immediately in front of and immediately behind the respective intersections of the first integration threshold value and the second integration threshold value with the integrated waveform data.

10. The detection method according to claim 7,
wherein the integration step comprises:
a first integration step of sampling the binarized signal at a predetermined cycle to generate first waveform data and integrating the first waveform data for a plurality of times of transmission of the transmission signal to generate first integrated waveform data,
a timing determination step of determining a reference timing based on a position of a characteristic point appearing on the first integrated waveform data due to the presence of the target object and generating a stop signal on a basis of the reference timing, and
a second integration step of generating, in a delay circuit unit comprising a plurality of delay elements connected to each other in series, second waveform data by causing each of the delay elements to incorporate the binarized signal in response to the stop signal and generating second integrated waveform data by integrating the second waveform data a plurality of times at the predetermined cycle, and
wherein the distance calculation step comprises calculating the first distance value and the second distance value from the respective intersections of the first integration threshold value and the second integration threshold value with the second integrated waveform data.

11. The detection method according to claim 10,
wherein the second integration step comprises integrating, in a plurality of the delay circuit units connected to each other in parallel, the second integrated waveform data generated by each of the delay circuit units.

12. The detection method according to claim 10, wherein
the first integration step is executed with a nanosecond-order resolution, and
the delay circuit unit has a picosecond-order resolution.

* * * * *